(12) United States Patent
Kasuya et al.

(10) Patent No.: US 6,176,802 B1
(45) Date of Patent: Jan. 23, 2001

(54) VEHICULAR AUTOMATIC TRANSMISSION

(75) Inventors: Satoru Kasuya; Tomochika Inagaki; Kazumasa Tsukamoto; Masahiro Hayabuchi; Masaaki Nishida; Kenji Gotou, all of Anjo (JP)

(73) Assignee: Aisin AW Co., Ltd., Anjo (JP)

( * ) Notice: Under 35 U.S.C. 154(b), the term of this patent shall be extended for 0 days.

(21) Appl. No.: 09/430,181

(22) Filed: Oct. 29, 1999

(30) Foreign Application Priority Data

Oct. 30, 1998 (JP) .................................................. 10-325981
Aug. 30, 1999 (JP) .................................................. 11-244136

(51) Int. Cl.$^7$ .............................. F16H 3/44; F16H 37/06
(52) U.S. Cl. ......................... 475/269; 475/275; 475/271; 475/330; 475/284; 475/325
(58) Field of Search .................................... 475/269, 275, 475/284, 323, 296, 280, 282, 286, 288, 290

(56) References Cited

U.S. PATENT DOCUMENTS

| | | | | |
|---|---|---|---|---|
| 3,941,013 | * | 3/1976 | Miller ................................... | 475/269 |
| 4,089,239 | * | 5/1978 | Murakami et al. ................... | 475/269 |
| 4,483,215 | * | 11/1984 | Ishimaru et al. ..................... | 475/269 |
| 5,006,102 | * | 4/1991 | Takase et al. ......................... | 475/282 |
| 5,106,352 | | 4/1992 | Lepelletier ............................ | 475/280 |

FOREIGN PATENT DOCUMENTS

| | | | |
|---|---|---|---|
| 579526 | * | 9/1993 | (EP) . |
| 63-297845 | * | 12/1988 | (JP) . |
| 63-297846 | * | 12/1988 | (JP) . |
| 3-92650 | * | 4/1991 | (JP) . |

* cited by examiner

Primary Examiner—Charles A Marmor
Assistant Examiner—Tisha D. Waddell
(74) Attorney, Agent, or Firm—Oliff & Berridge, PLC

(57) ABSTRACT

A reduction in the weight and size of a speed-change mechanism is obtained by shortening a high-torque transmission system. The speed-change shock is attenuated by reducing an inertia torque in a muilti-stage vehicular automatic transmission. The vehicular automatic transmission is equipped with a planetary gear set that receives a decelerated rotation and a non-decelerated rotation as inputs and outputs a plurality of speed-change rotations, a reduction planetary gear, an input shaft that passes through an inner side of the planetary gear set, first and third clutches that couple the input shaft to two different speed-change elements of the planetary gear set respectively through the reduction planetary gear in an engageable and disengageable manner, and a second clutch that couples the input shaft to the other speed-change element of the planetary gear set in an engageable and disengageable manner. The reduction planetary gear and the third clutch for transmitting a high torque are arranged on one side of the planetary gear set, whereas the first clutch for transmitting a high torque is arranged on the other side of the planetary gear set.

18 Claims, 18 Drawing Sheets

FIG. 3

| | C-1 | C-2 | C-3 | B-1 | B-2 | F-1 | GEAR RATIO | STEP |
|---|---|---|---|---|---|---|---|---|
| P | | | | | | | | |
| REV | | | ○ | | ○ | | 3.389 | |
| N | | | | | | | | |
| 1ST | ○ | | | | (○) | ○ | 4.067 | ⟩1.73 |
| 2ND | ○ | | | ○ | | | 2.354 | ⟩1.51 |
| 3RD | ○ | | ○ | | | | 1.564 | ⟩1.35 |
| 4TH | ○ | ○ | | | | | 1.161 | ⟩1.35 |
| 5TH | | ○ | ○ | | | | 0.857 | ⟩1.25 |
| 6TH | | ○ | | ○ | | | 0.684 | |

FIG. 12

| | C-1 | C-2 | C-3 | B-1 | B-2 | B-3 | F-1 | F-2 | GEAR RATIO | STEP |
|---|---|---|---|---|---|---|---|---|---|---|
| P | | | | | | | | | | |
| R | | | ○ | | | ○ | | | 3.394 | |
| N | | | | | | | | | | |
| 1st | ○ | | | △ | | | | ○ | 4.148 | 1.75 |
| 2nd | ○ | | | | ○ | | ○ | | 2.370 | 1.52 |
| 3rd | ○ | | ○ | | ● | △ | | | 1.556 | 1.35 |
| 4th | ○ | ○ | | | ● | | | | 1.155 | 1.34 |
| 5th | | ○ | ○ | | ● | | | | 0.859 | 1.25 |
| 6th | | ○ | | ○ | ● | | | | 0.686 | |

VEHICULAR AUTOMATIC TRANSMISSION

BACKGROUND OF THE INVENTION

1. Field of Invention

The invention relates to an automatic transmission that is installed in a vehicle and, more particularly, to arrangement of various components of a speed-change mechanism of a gear train of the transmission.

2. Description of Related Art

Demands for a multi-stage design have been placed on automatic transmissions not only to secure driveability but also to improve fuel consumption, which is indispensable to the conservation of energy. In order to satisfy such demands, the number of clutches and brakes and the number of speed-change elements per speed-change stage of a gear train need to be further reduced. Hence, U.S. Pat. No. 5,106,352 proposes a gear train that employs a planetary gear set composed of a minimum possible number of speed-change elements and establishes six forward speeds and one backward speed by means of three clutches and two brakes for operating the planetary gear set. In the gear train according to the patent, three clutches are used to suitably input an engine output rotation and a decelerated rotation thereof to a planetary gear set composed of four speed-change elements of the transmission as two different rotations, and two brakes are used to control stopping of two speed-change elements. In this manner, the gear train achieves six multi-staged speeds.

The six-speed automatic transmission of the aforementioned related art necessitates, as its feature, two clutches for transmitting an input that has been decelerated through a reduction planetary gear to two different speed-change elements of the planetary gear set respectively. Although this structure makes it possible to obtain favorable gear ratios of six speeds, it is necessary to secure torque capacities of the two clutches and power transmitting members thereof, namely, a high-torque transmission system for the purpose of transmitting a torque that has been amplified through deceleration.

Further, because of a characteristic of the gear train, the two clutches for inputting decelerated rotation rotate at a high speed at a certain speed-change stage. Therefore, the rigidity of the two clutches must be further increased not only to transmit a high torque but also to stand high-speed rotation. In this respect, according to the structure of the related art, since the two clutches for inputting of decelerated rotation are arranged on one side of the planetary gear set, a member coupling one of the clutches to the planetary gear set passes through an outer space of the other clutch. If such a member is arranged on the outer space of the other clutch, the centrifugal force resulting from high-speed rotation further increases. The rigidity of the member coupling one of the clutches to the planetary gear set needs to be further enhanced, which causes an increase in size and weight.

If the high-torque transmitting member that rotates together with the planetary gear set becomes long and heavy, the inertia torque increases correspondingly. Therefore, the speed-change controllability deteriorates and speed-change shock may be caused.

The invention has been made in consideration of such circumstances. It is an object of the invention to provide a vehicular automatic transmission wherein the enlargement of the mechanism resulting from a multi-staged design is averted and the speed-change controllability is enhanced through reduction in weight and size of a high-torque transmission system by an ingenious arrangement of two clutches for inputting of decelerated rotation with respect to a planetary gear set.

SUMMARY OF THE INVENTION

The invention has been made in consideration of such circumstances. It is an object of the invention to provide a vehicular automatic transmission wherein the enlargement of the mechanism resulting from a multi-staged design is averted and the speed-change controllability is enhanced through reduction in weight and size of a high-torque transmission system by using an ingenious arrangement of two clutches for inputting decelerated rotation with respect to a planetary gear set.

In order to achieve the above-stated object, according to the invention, there is provided a vehicular automatic transmission comprising a planetary gear set receiving a decelerated rotation and a non-decelerated rotation as inputs and outputting a plurality of speed-change rotations, a reduction planetary gear arranged axially in juxtaposition with the planetary gear set, an input shaft passing through an inner side of the planetary gear set, and first and third clutches coupling the input shaft to two different speed-change elements of the planetary gear set respectively through the reduction planetary gear in an engageable and disengageable manner, wherein the reduction planetary gear and the third clutch are arranged on one side of the planetary gear set and the first clutch is arranged on the other side of the planetary gear set.

With this structure, the first and third clutches are arranged on opposed sides of the planetary gear set. The length of transmission members extending from the first and third clutches to the speed-change elements of the planetary gear set can be minimized. Thereby the high-torque transmitting member that rotates together with the planetary gear set can be shortened, so that the transmission can be reduced in weight. Also, because the inertia can be decreased greatly, the speed-change controllability is enhanced.

In the aforementioned structure, it is advantageous to adopt a structure wherein an output element of the reduction planetary gear passes through the inner space of the planetary gear set and is connected to the first clutch.

According to this structure, the output member of the reduction planetary gear is connected to the first clutch through the inner space of the planetary gear set, whereby compact coupling can be realized. Also, as the high-torque transmitting member is not enlarged in diameter, the centrifugal force is reduced and the overall weight can be reduced correspondingly. Also, because the inertia can be made small, the speed-change controllability is enhanced.

Moreover, in the aforementioned structure, it is advantageous to adopt a structure wherein the planetary gear set is equipped with at least four speed-change elements, wherein the first speed-change element is connected to the reduction planetary gear by the first clutch in an engageable and disengageable manner, wherein the second speed-change element is connected to the reduction planetary gear by the third clutch in an engageable and disengageable manner and can be engaged to a transmission casing by first engage means, wherein the third speed-change elements is connected to the input shaft by a second clutch in an engageable and disengageable manner and can be engaged to the transmission casing by second engage means, and wherein the fourth speed-change element is connected to an output member.

According to this structure, the six-speed automatic transmission achieving the aforementioned effect can be realized with a small number of speed-change elements.

Further, in the aforementioned structure, it is advantageous to adopt a structure wherein a clutch drum of the first clutch is arranged such that an opening side thereof faces the planetary gear set and is connected to an output member of the reduction planetary gear.

According to this structure, the clutch drum of the first clutch is connected to the output member of the reduction planetary gear, so that the clutch drum of the first clutch can be arranged on the input shaft without the intervention of other components. Thus, the number of seal rings that are required to prevent leakage of the oil passage for supplying a hydraulic pressure to the hydraulic servo within the drum can be reduced.

Further, in the aforementioned structure, it is advantageous to adopt a structure wherein a frictional member of the third clutch is arranged on an outer space of the reduction planetary gear and wherein a clutch drum of the third clutch is connected to an input member for the planetary gear set.

Further, according to this structure, because the frictional member is arranged on the outer space of the reduction planetary gear, the axial length of the transmission can be reduced.

It is advantageous to adopt a structure wherein one element of the reduction planetary gear is constantly fixed to a boss portion that is elongated from the transmission casing and wherein a hydraulic servo for the third clutch is arranged on a boss portion on one side of the reduction planetary gear.

According to this structure, the hydraulic servo is arranged on the boss portion of the transmission casing, whereby it becomes possible to reduce the number of seal rings. Also, since one member is commonly used to fix one element of the reduction planetary gear and to secure an oil passage leading to the third clutch, the transmission can be made small in size.

Alternatively, it is possible to adopt a structure wherein the hydraulic servo for the third clutch is arranged on an input shaft on the other side of the reduction planetary gear and wherein the clutch drum of the third clutch is connected to the output member of the reduction planetary gear.

According to the structure, the hydraulic servo for the third clutch can directly be arranged on the input shaft. Therefore, the number of seal rings that are required to prevent leakage of the oil passage for supplying a hydraulic pressure from the input shaft to the hydraulic servo can be reduced.

Further, it is also advantageous to adopt a structure wherein the frictional member of the third clutch is arranged on an outer side of the hydraulic servo for the third clutch.

According to this structure, the frictional member and the hydraulic servo are arranged in an overlapping manner, whereby the axial length of the transmission can be reduced.

Moreover, it is advantageous to adopt a structure wherein the second clutch, which couples the input shaft to the other speed-change element of the planetary gear set in an engageable and disengageable manner, is arranged on the other side of the planetary gear set with respect to the first and third clutches.

According to this structure, the second clutch is not interposed between the first or third clutch and the planetary gear set. Thus, the length of the member coupling the first or third clutch to the planetary gear set can be reduced.

Further, it is also advantageous to adopt a structure wherein the frictional members of the first through third clutches are arranged on outer peripheries of other rotational members.

According to this structure, the respective frictional members of the first through third clutches are arranged on outer peripheries of other components. Thus, axial space for arrangement of the frictional members can be reduced, whereby the axial length of the transmission can be reduced.

To be more specific, it is advantageous to adopt a structure wherein the frictional member of the first clutch is arranged on the outer space of the planetary gear set, wherein the frictional member of the second clutch is arranged on the outer space of the hydraulic servo for the first clutch, and wherein the frictional member of the third clutch is arranged on the outer space of the reduction planetary gear.

According to this structure, while the frictional members of the respective clutches are arranged in the vicinity of the corresponding hydraulic servo, the axial length of the transmission can be reduced.

Moreover, it is advantageous to adopt a structure wherein a hydraulic servo for a second brake is arranged on the outer space of the hydraulic servo for the second clutch.

According to this structure, the hydraulic servo for the second brake can be arranged on the outer side of the second clutch without the necessity of providing a space for axial arrangement. Therefore, the axial length of the transmission can further be reduced.

Further, it is advantageous to adopt a structure wherein the vehicular automatic transmission is a transversely mounted transmission having a differential device and wherein a differential ring gear of the differential device is arranged at a location axially overlapping with the outer of the hydraulic servo for the third clutch and the frictional member of the third clutch.

According to this structure, in the case of constructing a transmission equipped with a differential device, it is possible to prevent the large-diameter ring gear from interfering with the speed-change mechanism and to enhance a degree of freedom in setting differential ratios.

Further, it is also advantageous to adopt a structure wherein the third clutch and the reduction planetary gear are arranged on a front side and the first and second clutches are arranged on a rear side with respect to the planetary gear set and wherein a first brake is arranged on the outer space of the third clutch.

According to this structure, the first brake can be arranged on the outer space of the third clutch. Thus, there is no need to complicate the arrangement of the first brake, so that the transmission can be made compact.

Further, it is also advantageous that the first brake be a band brake.

According to this structure, the first brake is a band brake. Therefore, the transmission can be reduced in diameter.

Further, it is also advantageous to adopt a structure wherein an oil passage leading to the hydraulic servo for the third clutch and a lubricating oil passage communicate with an in-casing oil passage in one casing wall and wherein oil passages leading to the hydraulic servos for the first and second clutches communicate with an in-casing oil passage in the other casing wall.

According to this structure, the oil passages can be arranged in the transmission casing in good balance. Thus it is possible to prevent centralization of the oil passages within the casing and to enhance a degree of freedom in designing the oil passages.

Further, it is also advantageous to adopt a structure wherein a counter gear outputting an output of the planetary gear set to another shaft is provided and wherein the counter gear is arranged between the planetary gear set and the third clutch.

According to this structure, in the case where the transmission outputs its output from the counter gear, the counter gear is arranged between the planetary gear set and the third clutch, whereby the first clutch can be arranged adjacent to the planetary gear set. The first clutch rotates at a higher speed than the third clutch. Hence, by minimizing the length of the high-speed rotational member, the transmission can be reduced in weight, and the speed-change controllability is enhanced.

BRIEF DESCRIPTION OF THE DRAWINGS

The foregoing and further objects, features and advantages of the invention will become apparent from the following description of preferred embodiments with reference to the accompanying drawings, wherein:

FIG. 3 is a chart showing operation of the gear train, gear ratios that are established, and gear ratio steps;

FIG. 12 is a chart showing operation of the gear train of the seventh embodiment, gear ratios that are established, and gear ratio steps;

DETAILED DESCRIPTION OF PREFERRED EMBODIMENTS

Figure 1:
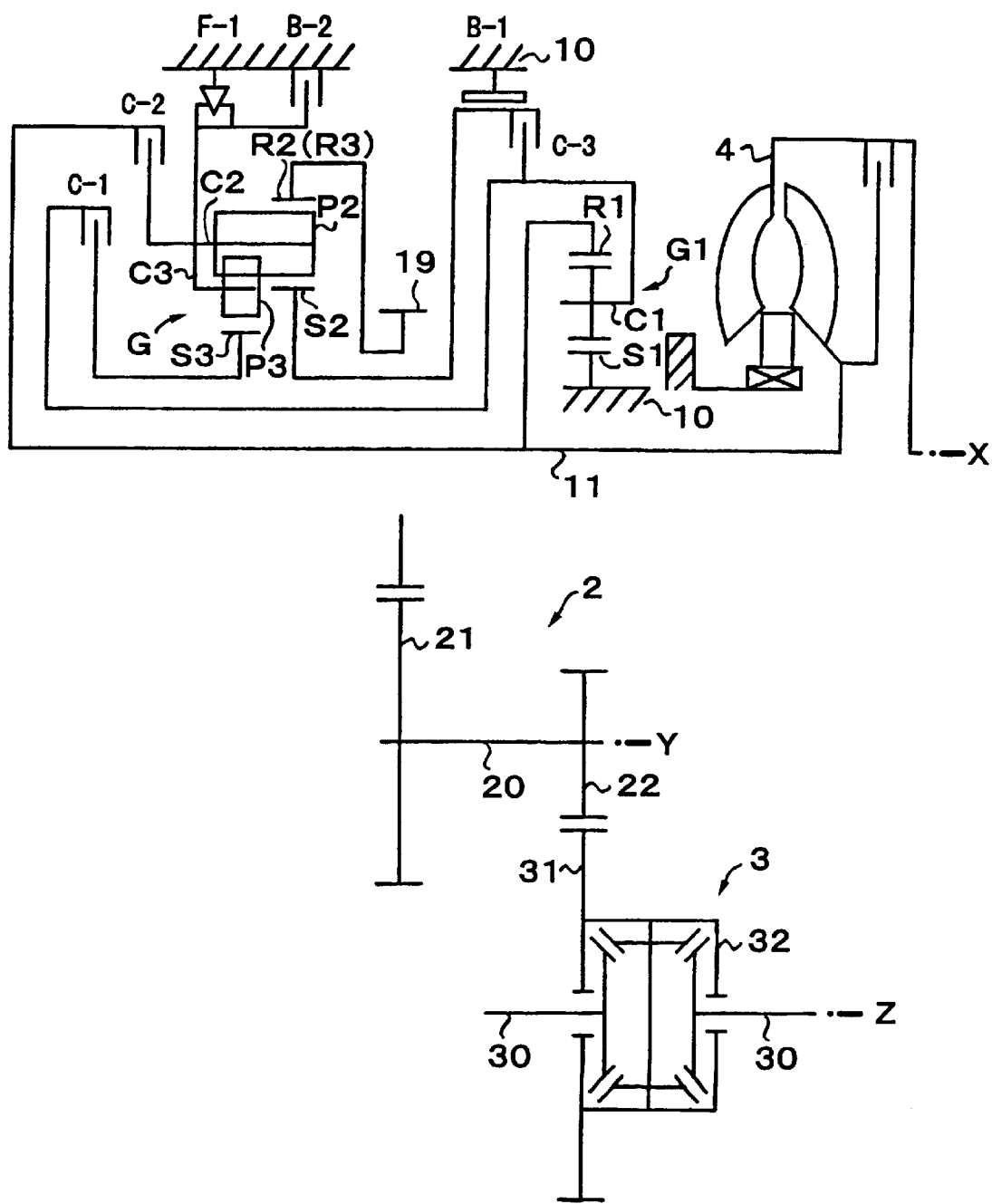
FIG. 1 is a schematic view showing, in an expanded manner, a gear train of a vehicular automatic transmission according to a first embodiment of the invention.
Figure 2:
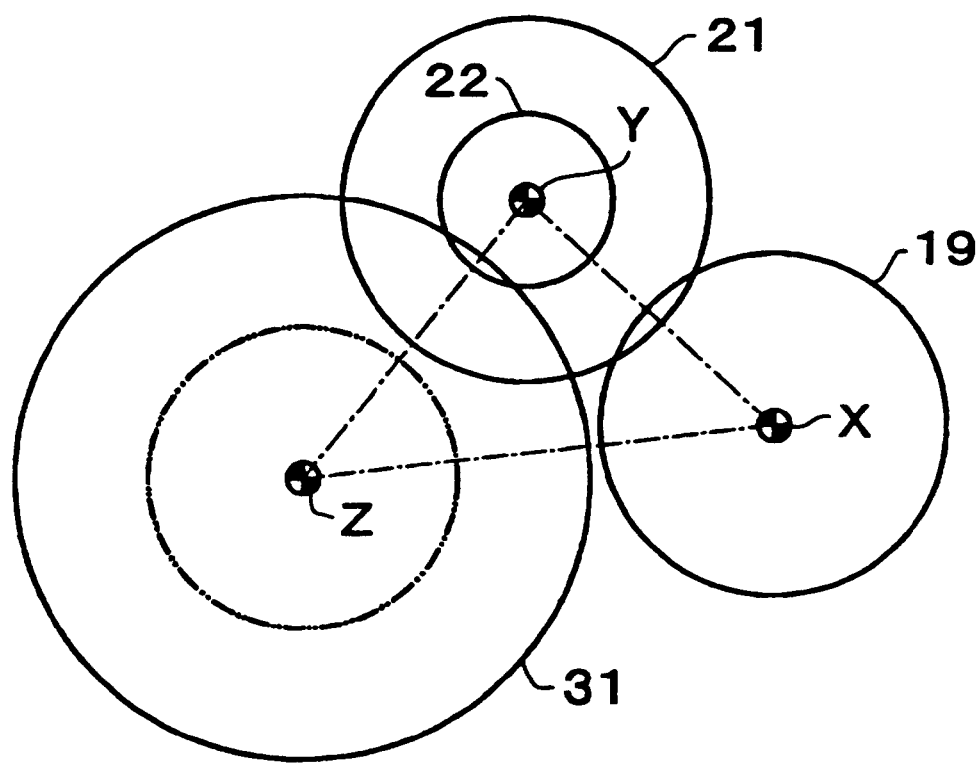
FIG. 2 is an axial end face view showing an actual positional relationship among three shafts of the gear train.

Embodiments of the invention will be described hereinafter with reference to the drawings. FIG. 1 is a schematic diagram showing a gear train of a vehicular automatic transmission according to a first embodiment of the invention, with shafts thereof being deployed in a common plane. FIG. 2 shows the actual positional relationship among the shafts as viewed from an end face of the automatic transmission. The automatic transmission is designed as a horizontal transaxial composed of three shafts, with respective elements being arranged on a main shaft X, a counter shaft Y and a differential shaft Z. A speed-change mechanism on the main shaft X is equipped with a planetary gear set G, a reduction planetary gear G1, an input shaft 11, a first clutch C-1, a third clutch C-3, and a second clutch C-2. The planetary gear set G receives a decelerated rotation and a non-decelerated rotation as inputs and outputs a plurality of speed-change rotations. The reduction planetary gear G1 is arranged in juxtaposition with the planetary gear set G in the axial direction. The input shaft 11 passes through an inner side of the planetary gear set G. The first and third clutches C-1, C-3 couple the input shaft 11 to two different speed-change elements S3, S2 through the reduction planetary gear G1 in an engageable and disengageable manner. The second clutch C-2 couples the input shaft 11 to the other speed-change element C2(C3) of the planetary gear set G in an engageable and disengageable manner.

The planetary gear set G is equipped with four speed-change elements S2, S3, C2(C3) and R2(R3). The first speed-change element S3 is connected to the reduction planetary gear G1 by the first clutch C-1 in an engageable and disengageable manner. The second speed-change element S2 is connected to the reduction planetary gear G1 by the third clutch C-3 in an engageable and disengageable manner and can be engaged to a transmission casing 10 by first engage means, which is a brake or a one-way clutch in parallel with the brake. The third speed-change element C2(C3) is connected to the input shaft 11 by the second clutch C-2 in an engageable and disengageable manner and can be engaged to the transmission casing 10 by second engage means, which is a brake or a one-way clutch in parallel with the brake. The fourth speed-change element R2(R3) is connected to an output member 19. In the gear train shown in the drawing, a one-way clutch F-1 is arranged in parallel with a brake B-2. The one-way clutch F-1 is used to avoid complicated hydraulic pressure control for interchange of the brake B-2 and the brake B-1 and to simplify release control of the brake B-2. In response to engagement of the brake B-1, the one-way clutch F-1 automatically releases an engaging force. The one-way clutch F-1 is an equivalent of the brake B-2.

The gear train of this embodiment will be described hereinafter in further detail. A torque converter 4, provided with a lock-up clutch for transmitting a rotation of an engine (not shown) to the input shaft 11, is arranged on the main shaft X. A counter gear 2 is arranged on the counter shaft Y.

Arranged in the counter gear 2 are a large-diameter counter driven gear 21 that is fixed to a counter shaft 20 and meshes with a counter drive gear (output member) 19, and a small-diameter differential drive pinion gear 22 that is also fixed to the counter shaft 20 and meshes with a differential ring gear 31. An output from the side of the main shaft X is decelerated and inverted by the large-diameter counter driven gear 21 and the small-diameter differential drive pinion gear 22 and then transmitted to a differential device 3. The differential device 3 is arranged on the differential shaft Z. In the differential device 3, a differential casing 32 is fixed to the differential ring gear 31. A differential rotation of a differential gear arranged in the differential casing 32 is outputted to left and right axles 30 and used as a resultant wheel driving force.

The planetary gear set G has the structure of a Ravigneaux type gear set, which is composed of a pair of sun gears S2, S3, a ring gear R2(R3), a pair of pinion gears P2, P3 and a carrier C2(C3). The diameter of the sun gear S2 is larger than the diameter of the sun gear S3. The pinion gears P2, P3 mesh with each other. One of the pinion gears P2, P3 meshes with the large-diameter sun gear S2 and the ring gear R2(R3), and the other of the pinion gears P2, P3 meshes with the small-diameter sun gear S3. The carrier C2(C3) supports the pinion gears P2, P3. In this embodiment, the small-diameter sun gear S3 is the first speed-change element, the large-diameter sun gear S2 is the second speed-change element, the carrier C2(C3) is the third speed-change element, and the ring gear R2(R3) is the fourth speed-change element. The reduction planetary gear G1 has a simple planetary structure composed of three elements, namely, a sun gear S1, a carrier C1 for supporting a pinion gear meshing with the sun gear S1, and a ling gear R1 meshing with the pinion gear.

The first speed-change element of the planetary gear set G, namely, the small-diameter sun gear S3 is connected to the first clutch C-1. The second speed-change element of the planetary gear set G, namely, the large-diameter sun gear S2 is connected to the third clutch C-3 and can be engaged to the automatic transmission casing 10 by a first brake B-1, that is composed of a band brake. The carrier C2(C3), which is the third speed-change element, is connected to the input shaft 11 through the second clutch C-2 and can be engaged to the transmission casing 10 by a second brake B-2. In addition, the carrier C2(C3) can be engaged to the transmission casing 10 by the one-way clutch F-1 such that the carrier C2(C3) can rotate in a single direction. The fourth speed-change element, namely, the ring gear R2(R3) is connected to the counter drive gear 19. The sun gear S1 of the reduction planetary gear G1 is constantly fixed to the transmission casing 10. The reduction planetary gear G1 is connected to the input shaft 11, with the ring gear R1 serving as an input element. Also, the reduction planetary gear G1 is connected to the planetary gear set G through the first clutch C-1 and the third clutch C-3, with the carrier C1 serving as an output element.

Figure 4:
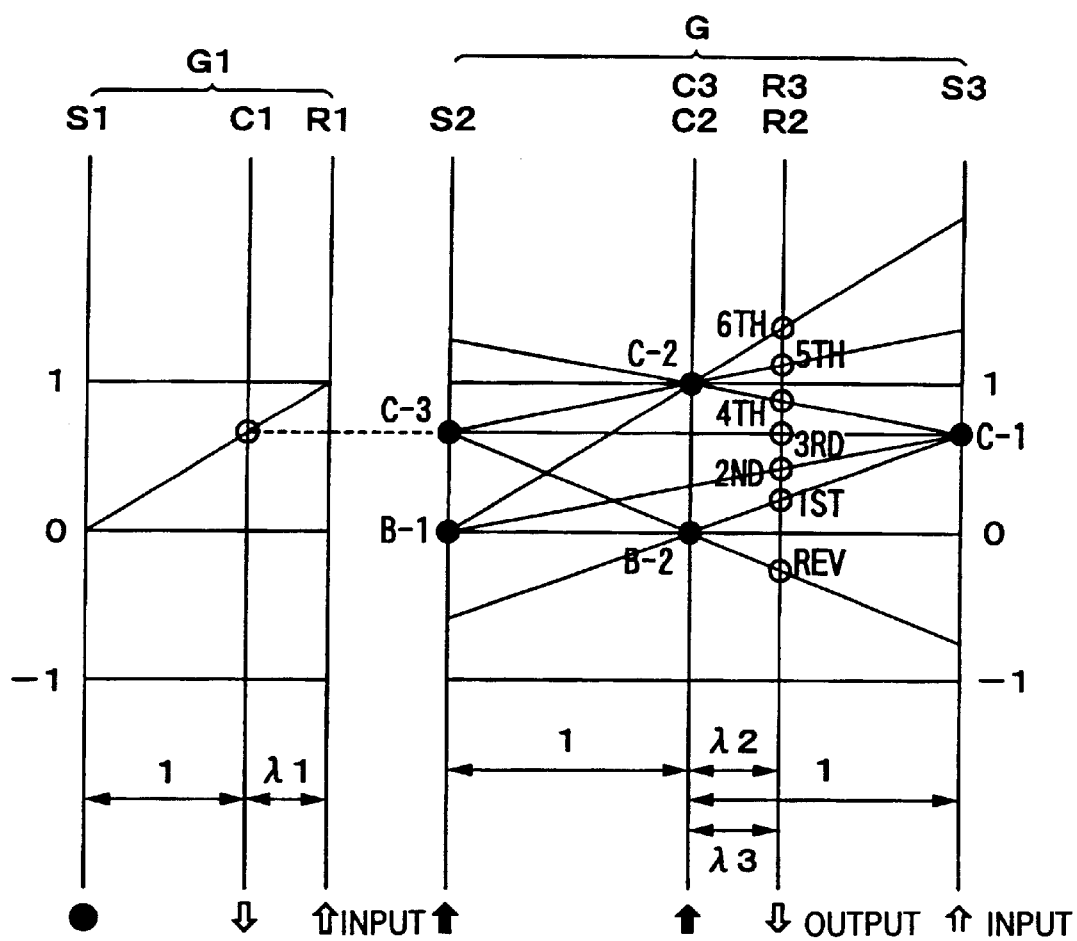
FIG. 4 is a speed diagram of the gear train.

The automatic transmission having such a structure performs a speed-change operation based on a vehicle load and a vehicle speed and within the scope of a speed-change stage corresponding to a range selected by a driver, through control by means of a hydraulic pressure control device and an electronic control unit (not shown). FIG. 3 is a graphic chart showing speed-change stages that are established by engaging and releasing respective clutches and brakes (a circle represents engagement, and a blank represents release). FIG. 4 is a speed diagram showing the relationships between speed-change stages that are established by engaging the respective clutches and brakes (a large black dot represents engagement thereof) and corresponding speed ratios of the respective speed-change elements. Referring to FIG. 4, longitudinal axes represent the respective elements of the reduction planetary gear G1 and the respective speed-change elements of the planetary gear set G. The widths of the respective longitudinal axes in the transverse direction represent a relationship among gear ratios. The longitudinal positions represent speed ratios. For example, if the sun gear S1 of the reduction planetary gear G1 is fixed (speed ratio 0) and an input (speed ratio 1) is supplied to the ring gear R1, a decelerated rotation (speed ratio corresponding to an intersection of a line that connects a point indicative of the speed ratio 0 of the sun gear S1 to a point indicative of the speed ratio 1 of the ring gear R1 with a longitudinal line that represents the carrier C1) is outputted to the carrier C1. This decelerated rotation is inputted to the sun gear S3 of the planetary gear set G by engaging the first clutch C-1. Also, when the carrier C2(C3) is engaged (speed ratio 0) by engaging the second brake B-2, a decelerated rotation of a first speed (1ST) is outputted to the ring gear R3(R2), and the sun gear S2 idle-rotates reversely (speed ratio -) with respect to the sun gear S3 and the ring gear R3(R2).

As can be understood by referring to FIGS. 3 and 4, the first speed (1ST) is established by engaging the first clutch C-1 and the second brake B-2. (In this embodiment, as can be understood by referring to the operational chart, the one-way clutch F-1 is automatically engaged instead of actually engaging the second brake B-2. It will be explained later in detail why the one-way clutch F-1 is engaged in this case and why the engagement of the one-way clutch F-1 corresponds to the engagement of the second brake B-2). In this case, referring to FIG. 1, the rotation that has been decelerated from the input shaft 11 through the reduction planetary gear G1 is inputted to the small-diameter sun gear S3 through the first clutch C-1. A reaction force is gained from the carrier C2,C3 that has been stopped by engaging the one-way clutch F-1, and a decelerated rotation with a maximum deceleration ratio of the ring gear R2(R3) is outputted to the counter drive gear 19.

Next, a second speed (2ND) is established by engaging the first clutch C-1 and the first brake B-1. In this case, the rotation that has been decelerated from the input shaft 11 through the reduction planetary gear G1 is inputted to the small-diameter sun gear S3 through the first clutch C-1. A reaction force is gained from the large diameter sun gear S2 that has been stopped by engaging the first brake B-1, and a decelerated rotation of the ring gear R2 (R3) is outputted to the counter drive gear 19. At this moment, as can be seen from FIG. 4, the deceleration ratio is smaller than that of the first speed (1ST).

Further, a third speed (3RD) is established by simultaneously engaging the first clutch C-1 and the third clutch C-3. In this case, the rotation that has been decelerated from the input shaft 11 through the reduction planetary gear G1 is simultaneously inputted to the large diameter sun gear S2 and the small-diameter sun gear S3 through the first clutch C-1 and the third clutch C-3. The planetary gear set G then assumes a direct-coupled state. Thus, the rotation of the ring gear R2(R3), which is equal to the rotation inputted to both the sun gears S2, S3, is outputted to the counter drive gear 19, as a rotation that has been decelerated with respect to the rotation of the input shaft 11.

Furthermore, a fourth speed (4TH) is established by simultaneously engaging the first clutch C-1 and the second clutch C-2. In this case, on one hand, the rotation that has been decelerated from the input shaft 11 through the reduction planetary gear G1 is inputted to the sun gear S3 through the first clutch C-1. On the other hand, the non-decelerated rotation that has been inputted from the input shaft 11 through the second clutch C-2 is inputted to the carrier C3. An intermediate rotation of the two rotations thus inputted is outputted to the counter drive gear 19 as a rotation of the ring gear R2(R3) that has been slightly decelerated with respect to the rotation of the input shaft 11.

Next, a fifth speed (5TH) is established by simultaneously engaging the second clutch C-2 and the third clutch C-3. In this case, on one hand, the rotation that has been decelerated from the input shaft 11 through the reduction planetary gear G1 is inputted to the sun gear S2 through the third clutch C-3. On the other hand, the non-decelerated rotation that has been inputted from the input shaft 11 through the second clutch C-2 is inputted to the carrier C2. Thus, a rotation of the ring gear R2(R3) that has been slightly accelerated with respect to the rotation of the input shaft 11 is outputted to the counter drive gear 19.

Then, a sixth speed (6TH) is established by engaging the second clutch C-2 and the first brake B-1. In this case, a non-decelerated rotation is inputted only to the carrier C2 from the input shaft 11 through the second clutch C-2. A further accelerated rotation of the ring gear R2(R3), which gains a reaction force from the sun gear S2 that has been stopped by engaging the first brake B-1, is outputted to the counter drive gear 19.

A reverse speed (REV) is established by engaging the third clutch C-3 and the second brake B-2. In this case, the rotation that has been decelerated from the input shaft 11 through the reduction planetary gear G1 is inputted to the sun gear S2 through the third clutch C-3. A reverse rotation of the ring gear R2(R3), which gains a reaction force from the carrier C2 that has been stopped by engaging the second brake B-2, is outputted to the counter drive gear 19.

As described above briefly, the relationship between the one-way clutch F-1 and the second brake B-2 will now be described. As can be seen from the relationship of engagement and release of the first and the second brakes B-1, B-2 at the time of the aforementioned first and second speeds, the two brakes B-1, B-2 are frictional engagement elements that are, according to what is called, interchanged at the time of up-shift and down-shift operations between the two speed-change stages. That is, one of the brakes is released and the other is engaged at the same time. Such an interchange of the frictional engagement elements requires simultaneously controlling, with a high precision, an engagement pressure and a release pressure of hydraulic servos for operating the frictional engagement elements. In order to perform such control, control valves need to be added for this purpose, and the hydraulic circuit becomes complicated. Thus, the embodiment makes use of the fact that the reaction torque applied to the carrier C2(C3) at the first speed is reversed with respect to the reaction torque applied to the carrier C2(C3) at the second speed. That is, the direction of engagement of the one-way clutch F-1 is made coincident with the direction of supporting a reaction torque at the time of the first speed, whereby the one-way clutch F-1 performs substantially the same function as engagement of the second brake B-2. For this reason, instead of engaging the second brake B-2 at the time of the first speed, the carrier C2(C3) is engaged. However, in a coast running state of the vehicle where the wheels are being driven, the reaction torque applied to the carrier C2(C3) is reversed in direction with respect to a drive state of the engine. Therefore, in order to obtain an engine braking effect, the second brake B-2 needs to be engaged as indicated by a white circle in parentheses in FIG. 3. Accordingly, in terms of establishment of speed-change stages, it is also possible to adopt a structure wherein the first speed is established by engaging the second brake B-2 with no one-way clutch being provided.

The respective speed-change stages that are thus established constitute good speed steps with a substantially equal interval for the respective speed-change stages. This is qualitatively apparent from the speed diagram of FIG. 4 by referring to the intervals between the white circles indicative of speed ratios of the ring gear R2(R3) in up-and-down directions. If this relationship is quantitatively represented by setting values, the gear ratios shown in FIG. 3 are obtained. In this case, if it is assumed that the ratio $\lambda 1$ of the number of teeth of the sun gear S1 to the number of teeth of the ring gear R1 is set to 44/78, that the ratio $\lambda 2$ of the number of teeth of the sun gear S2, which is the large diameter sun gear of the planetary gear set G, to the number of teeth of the ring gear R2 (R3) is set to 36/78, and that the ratio $\lambda 3$ of the number of teeth of the sun gear S3, which is the small-diameter sun gear, to the number of teeth of the ring gear R3 is set to 30/78, the following 1/0 gear ratios are obtained:

first speed (1ST):$(1+\lambda 1)/\lambda 3=4.067$;
second speed (2ND):$(1+\lambda 1)/(\lambda 2+\lambda 3)/\lambda 3(1+\lambda 2)=2.354$;
third speed (3RD):$1+\lambda 1=1564$;
fourth speed (4TH):$(1+\lambda 1)/(1+\lambda 1-\lambda 1\cdot\lambda 3)=1.161$;
fifth speed (5TH):$(1+\lambda 1)/(1+\lambda 1+\lambda 1\cdot\lambda 2)=0.857$:
sixth speed (6TH):$1/(1+\lambda 2)=0.684$; and
reverse speed (REV):$-(1+\lambda 1)/\lambda 2=-3.389$.

The steps between the respective gear ratios are as follows:

between the first and second speeds: 1.73.
between the second and third speeds: 1.51;
between the third and fourth speeds: 1.35;
between the fourth and fifth speeds: 1.35; and
between the fifth and sixth speeds: 1.25.

Referring back to FIG. 1, according to the features of the invention, in this gear train, the reduction planetary gear G1 and the third clutch C-3 are arranged on one side of the planetary gear set G, and the first clutch C-1 is arranged on the other side of the planetary gear set G. In this manner, the first clutch C-1 and the third clutch C-3 are separately arranged on opposed sides of the planetary gear set G. Therefore, the length of the transmission member extending from the first clutch C-1 and the third clutch C-3 to the speed-change elements S2, S3 of the planetary gear set G can be minimized. Accordingly, the length of the high-torque transmission member that rotates together with the planetary gear set G can be reduced. As a result, the transmission can be reduced in weight and the inertia can be made small, whereby the speed-change controllability is enhanced.

Furthermore, the carrier C1, which is an output element of the reduction planetary gear G1, passes through the inner space of the planetary gear set G and is connected to the first clutch C-1. Due to this structure, the output element of the reduction planetary gear G1 can be connected to the first clutch C-1 compactly. Also, the diameter of the high torque transmission member is not enlarged. Thus, the centrifugal force applied thereto is reduced correspondingly, and the inertia can be made small. As a result, the speed change controllability is enhanced.

Furthermore, the transmission is equipped with the counter drive gear 19 that outputs an output of the planetary gear set G to another shaft. Hence, the counter drive gear 19 is arranged between the planetary gear set G and the third clutch C-3. Because of this arrangement of the counter drive gear 19, the first clutch C-1 can be arranged adjacent to the planetary gear set G. This arrangement takes into account that the first clutch C-1 rotates at a higher speed than the third clutch C-3 and thus contributes to the reduction of weight of the transmission by minimizing the length of the member that rotates at a high speed. As a result, the speed-change controllability is also enhanced.

Figure 5:
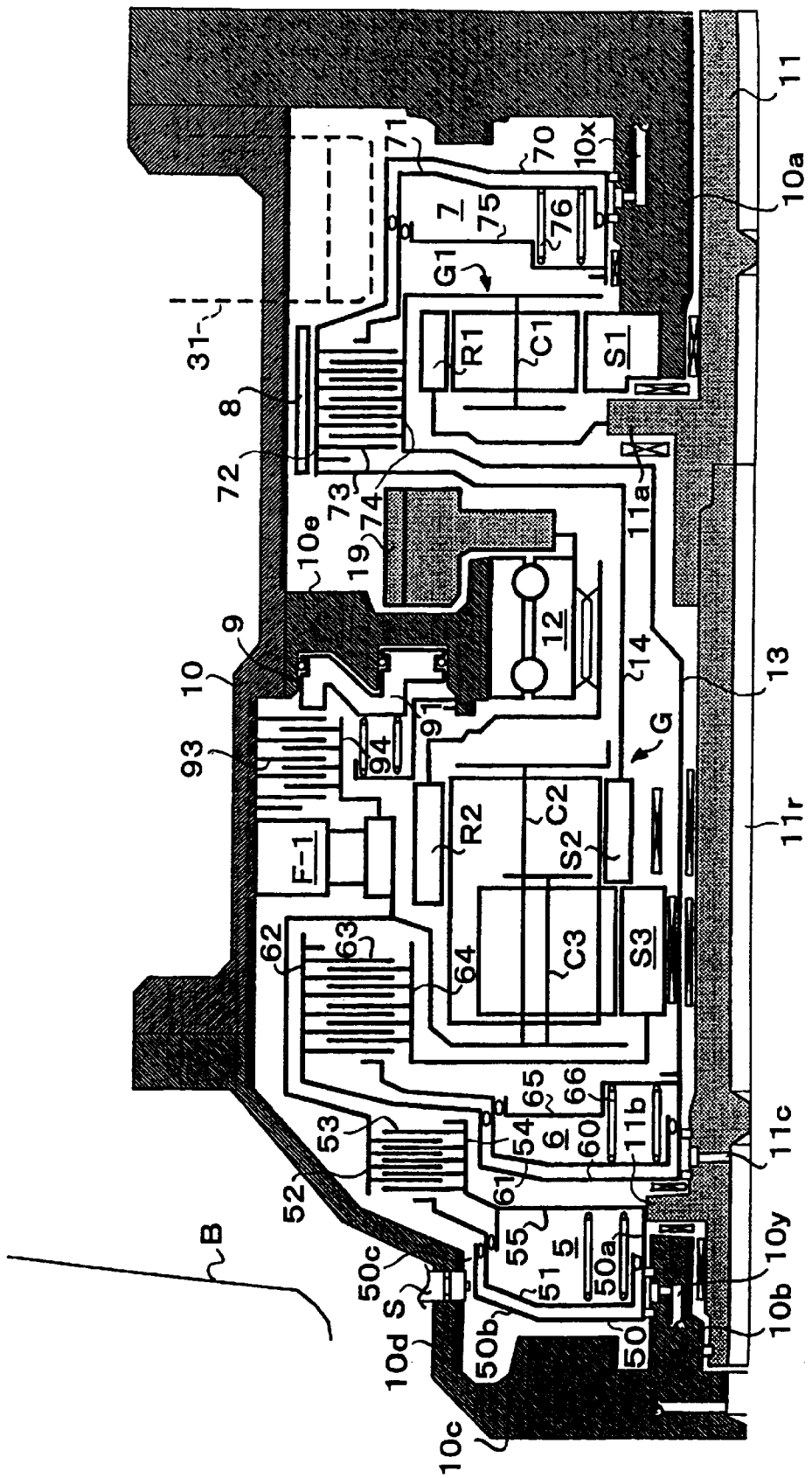
FIG. 5 is a schematic, part cross-sectional view showing only a main shaft section of the gear train.

Next, reference will be made to FIG. 5, which is a schematic, part cross-sectional view showing the structure of the automatic transmission more specifically. The respective components that have been described above with reference to the schematic diagram of FIG. 1 are denoted by the same reference numerals and will not be described again. However, it will be described herein how the respective clutches and brakes are related to the details that cannot be understood from the schematic diagram, mainly, to the input shaft 11, the planetary gear set G and the reduction planetary gear G1. Throughout the specification, if the clutches and brakes are of a multiple disc type, the terms "clutch" and "brake" generally refer to a frictional member composed of, at least, a disc designed as an engageable member and a separator plate, a drum and a hub designed as a power transmission member for supporting the frictional member by means of spline engagement, and a hydraulic servo composed of a return spring, a piston and a cylinder contained in the drum. Also, the band-type brake generally refers to a band designed as an engageable member and a hydraulic servo composed of a cylinder, a piston and a return spring.

The input shaft 11 is a hollow shaft in which a hydraulic passage for supplying and discharging a servo pressure and a lubricating oil passage 11r are formed. The input shaft 11 is rotatably supported on front end and rear end sides thereof by a front-side boss portion 10a and a rear-side boss portion 10b through bearings respectively. The front-side boss portion 10a and the rear-side boss portion 10b extend from the transmission casing 10. The input shaft 11 is axially supported by thrust bearings that are interposed between flanges 11a, 11b and leading ends of the boss portions. The flanges 11a, 11b are formed adjacent to respective portions where the input shaft 11 is supported by the boss portions 10a, 10b.

The reduction planetary gear G1, the planetary gear set G and hydraulic servos 7, 6 and 5 for the three clutches C-1 through C-3 are arranged axially in order on the side of the outer space of the input shaft 11. Frictional members 73, 63, 53 and 93 of the respective clutches and brakes are arranged on the side of the outer space, radially overlapping with the reduction planetary gear G1, the planetary gear set G and the hydraulic servos 7, 6 and 5. This arrangement reduces the axial dimension of the space needed for arrangement of the frictional members. Moreover, as the frictional members of the respective clutches and brakes are arranged on the side of the outer space, their diameters are increased and torque capacities can be increased correspondingly. Accordingly, as for the frictional members 73, 63 that overlap with the outer side of the reduction planetary gear G1 and the planetary gear set G, the number of components is reduced so as to decrease the axial dimension. Further the frictional member 53 of the hydraulic servo 5 is arranged on the outer side of the hydraulic servo 6 in an overlapping manner. Because the frictional member 63 is arranged on the outer side of the planetary gear set G, the torque capacity is increased correspondingly and the pressure-receiving surface of the hydraulic servo 6 can be made small. Thus, the hydraulic servo 6 is reduced in diameter, whereby it also becomes possible to reduce the diameter of the frictional member 53 overlapping with the outer side of the hydraulic servo 6. Accordingly, this structure makes it possible to prevent the radial dimension from increasing and to reduce the axial dimension to a maximum possible extent.

Furthermore, according to the embodiment, the reduction planetary gear G1 is arranged on the front side (with respect to the front of the vehicle) of the speed-change mechanism, whereas the planetary gear set G is arranged on the rear side of the speed-change mechanism. The hydraulic servo 7 for the third clutch C-3 is arranged in front of the reduction planetary gear G1. The hydraulic servo 6 for the first clutch C-1 is arranged behind the planetary gear set G. The hydraulic servo 5 for the second clutch C-2 is arranged behind the hydraulic servo 6 for the first clutch C-1. The frictional member 63 of the first clutch C-1 is arranged on the outer side of the planetary gear set G in an overlapping manner. The frictional member 73 for the third clutch C-3 is arranged on the outer side of the reduction planetary gear G1 in an overlapping manner. The frictional member 53 for the second clutch C-2 is arranged on the outer side of the hydraulic servo 6 for the first clutch C-1 in an overlapping manner. In this arrangement, the frictional members 63, 73 for the first and third clutches C-1, C-3, which necessitate a large capacity to transmit a decelerated rotation with an amplified torque, are arranged on the outer side of the planetary gear set G and the reduction planetary gear G1 that are arranged at axial positions where the restriction on radial dimension is relatively loose. Thereby the frictional members 63, 73 are increased in diameter in accordance with the torque capacity. The frictional member 53 of the second clutch C-2, which is allowed to have a relatively small torque capacity to directly transmit an inputted rotation, is arranged on the outer side of the hydraulic servo 6 for the first clutch C-1 in an overlapping manner. The first clutch C-1 is located behind the planetary gear set G and has been reduced in diameter in response to an enlargement in diameter of the frictional member 63. Thereby there is no frictional member arranged on the outer side of the hydraulic servo 5 for the second clutch C-2. Thus, in addition, to the fact that the hydraulic servo 5 for the second clutch C-2 is small in diameter, a small capacity suffices for the hydraulic servo 5. As a result the outer diameter of the rear portion of the speed-change mechanism has been reduced significantly. Therefore, according to this structure wherein the outer diameter of the rear end portion of the transmission is made small while reducing the axial dimension to a maximum possible extent, it is possible to avert interference with a vehicle-side member B and to further enhance mountability of the multi-staged transmission to the vehicle.

As described previously with reference to the schematic diagram in FIG. 1, the transmission has the differential ring gear 31 arranged on the differential shaft Z that is parallel to the input shaft 11. Thus, the hydraulic servo 7 for the third clutch C-3 is arranged at a location radially overlapping with the differential ring gear 31, and the frictional member 73 of the third clutch C-3 is arranged axially offset from the differential ring gear 31. In this structure, despite the fact that the outer space of the differential ring gear 31 is inside the speed-change mechanism, the differential ring gear 31 does not interfere with the large-diameter portion of the speed-change mechanism. Thus, it is possible to provide a great degree of freedom in setting an interaxle distance, between the input shaft 11 that is designed as the main shaft X of the transmission and the differential shaft Z that is parallel to the input shaft 11. Accordingly, it is possible to set a good differential gear ratio in accordance with a requirement of the vehicle.

On the other hand, the reduction planetary gear G1, which has a simple planetary structure arranged around the input shaft 11, is arranged on the front side of the speed-change mechanism, with the sun gear S1 designed as a reaction force element being fixed to the leading-end outer space of the front-side boss portion 10a and with the ring gear R1 designed as an input element being connected to the flange 11a of the input shaft 11. The carrier C1 designed as an output element is connected to a tubular portion of a decelerated rotation transmitting member 13. The tubular portion constitutes a hub 74 of the third clutch C-3.

Next, the planetary gear set G is supported and held in position at a substantially intermediate portion of the input shaft 11, with the sun gears S2, S3 being supported through a bearing on the outer space of the decelerated rotation transmitting member 13, which is supported by the input shaft 11 through a bearing. The sun gear S2, which is designed as the second speed-change element of the planetary gear set G, is connected to a drum 72 of the third clutch C-3 by means of a coupling member 14. Further, the sun gear S3 designed as the first speed-change element is connected to a hub 64 of the first clutch C-1. Then, the carrier C2(C3), the third speed-change element, is connected to a drum 52 of the second clutch C-2 and a hub 94 of the second brake B-2 through an inner race of the one-way clutch F-1. Furthermore, the ring gear R2(R3) designed as the fourth speed-change element is spline-connected to the counter drive gear 19 through a coupling member.

The hydraulic servo 7 for the third clutch C-3 is an-angel on the front side of the reduction planetary gear G1. The hydraulic servo 7 is equipped with a cylinder 70 rotatably supported on the outer space of the front-side boss portion 10a of the transmission casing and a piston 71 contained in the cylinder 70. The outer side of the cylinder 70 is enlarged in diameter and elongated so as to constitute a clutch drum 72. A hydraulic pressure is supplied to and discharged from the hydraulic servo 7 through an in-casing oil passage 10x formed in the front-side boss portion 10a. In the drawing, reference numeral 75 denotes a cancel plate for applying a hydraulic pressure to the back face of the piston 71 so as to counterbalance a centrifugal hydraulic pressure, and reference numeral 76 denotes a return spring.

The frictional member 73 of the third clutch C-3 is composed of multi-plate frictional member discs and separator plates. The inner side of the multi-plate frictional member discs are in spline engagement with the hub 74, and the outer side of the separator plates are in spline engagement with the drum 72. The frictional member 73 of the third clutch C-3, which is clamped between a backing plate that is fixed to the leading end of the drum 72 and a piston 71 that is pressed out of the cylinder 70 by supplying the hydraulic servo 7 with a hydraulic pressure, operates to be engaged, whereby a torque is transmitted from the hub 74 to the drum 72.

The hydraulic servo 6 for the first clutch C-1 is arranged on the rear side of the planetary gear set G, and is equipped with a cylinder 60 connected to the decelerated rotation transmitting member 13 and with a piston 61 contained in the cylinder 60. Also in this case, the outer side of the cylinder 60 is enlarged in diameter and elongated so as to constitute a clutch drum 62. Accordingly, the clutch drum 62 of the first clutch C-1 is arranged with an opening side thereof being directed toward the planetary gear set G. A hydraulic pressure is supplied to and discharged from the hydraulic servo 6 through an oil passage 11c formed in the input shaft 11. The hydraulic servo 6 is also equipped with a cancel plate and a return spring, which are denoted by reference numerals 65, 66 respectively.

The frictional member 63 of the first clutch C-1 is composed of multi-plate frictional member discs and separator plates. The inner side of the multi-plate frictional member discs arc in spline engagement with the hub 64, and the outer side of the separator plates are in spline engagement with the drum 62. The frictional member 63 of the first clutch C-1, which is clamped between a backing plate that is fixed to the leading end of the drum 62 and a piston 61 that is pressed out of the cylinder 60 by supplying the hydraulic servo 6 with a hydraulic pressure, operates to be engaged, whereby a torque is transmitted from the drum 62 to the hub 64.

The hydraulic servo 5 for the second clutch C-2 is arranged behind the hydraulic servo 6 for the first clutch C-1, namely, at the rearmost portion of the speed-change mechanism, with an inner tubular portion 50a of a cylinder 50 containing a piston 51 securely supported by the flange portion 11b of the input shaft 11, and with a back face portion 50b and an outer tubular portion 50c facing a rear end wall 10c and a peripheral wall 10d of the transmission casing 10. A hydraulic pressure is supplied to and discharged from the hydraulic servo 5 through an in-casing oil passage 10y formed in the rear-side boss portion 10b. In the hydraulic servo 5, a clutch hub 54 is formed on the outer side of a cancel plate 55 defining a cancel chamber, and the frictional member 53 is supported between the hub 54 and the drum 52 connected to the carrier. Due to this structure, the input rotation required to control the transmission can directly be detected from a rotation of the cylinder 50 of the hydraulic servo 5 for the second clutch C-2, using a sensor S provided in the transmission casing 10. Thus, the input rotation can easily be detected, and there is no need to arrange the sensor S inside the speed-change mechanism or to resort to a complicated measure, for example, to perform detection with the aid of special detection means.

The frictional member 53 for the second clutch C-2 is composed of multi-plate frictional member discs and separator plates. The inner side of the multi-plate frictional member discs are in spline engagement with the hub 54, and the outer side of the separator plates are in spline engagement with the drum 52. The clutch, which is clamped between a backing plate that is fixed to the leading end of the hub 54 and a piston 51 that is pressed out of the cylinder 50 by supplying the hydraulic servo 5 with a hydraulic pressure, operates to be engaged, whereby a torque is transmitted from the hub 54 to the drum 52.

The first brake B-1 is a band brake. A brake band 8 of the band brake is arranged on the outer space of the drum 72 of the third clutch C-3, and the drum 72 serves as a brake drum. Thus, the first brake B-1 does not require space in the axial direction, and is arranged with the radial dimension thereof being minimally increased. A hydraulic servo for the band brake is located at the same axial position as the brake band 8 and extends in a tangential direction with respect to the drum 72. Therefore, the hydraulic servo is not shown in the drawings.

As is the case with the respective clutches C-1 through C-3, the second brake B-2 has a multi-plate construction. A frictional member 93 of the second brake B-2 is arranged on the outer side of the planetary set G in juxtaposition with the one-way clutch F-1. A hydraulic servo 9 for the second brake B-2 is provided at a support 10e that is provided substantially at the center of the transmission casing 10 such that the hydraulic servo 9 incorporates a cylinder containing a piston 91.

As for supporting of the counter drive gear 19, the gear 19 is supported on the inner space of the support 10e through a bearing 12. To be more specific, the outer space of the boss portion axially extending along the inner space of the counter drive gear 19 is supported through the bearing 12 on the inner space of the support 10e of the transmission casing 10, which also functions as a hydraulic servo cylinder for the second brake B-2.

Hence, in this embodiment, the reduction planetary gear G1 and the planetary gear set G need to be arranged toward the inner-diameter side along the axial circumference to a maximum possible extent, for the purpose of realizing an absolutely compact speed-change mechanism. In terms of easiness of supply of hydraulic pressures and reduction of sliding function of a seal ring, it is desirable that the oil passages of the hydraulic servos 7, 6 and 5 for the respective clutches C3, C-1, C-2 be connected to one another through a relative rotation portion having the smallest possible diameter. The hydraulic servos 7, 6 and 5 are arranged on the inner-diameter side along the axial circumference and axially in juxtaposition with the counter drive gear 19. If the effective diameter is taken into consideration in combination with the number of frictional members, it is advantageous that the frictional members 73, 63 and 53 of the respective clutches have a large diameter. The frictional members 73, 63 and 53 are arranged on the outer side in an overlapping manner. In the thus-obtained intermediate space, the two brakes B-1, B-2 and the one-way clutch F-1 are rationally arranged. Due to this structure, the effect of reducing the axial dimension to a maximum possible extent is achieved.

Figure 6:
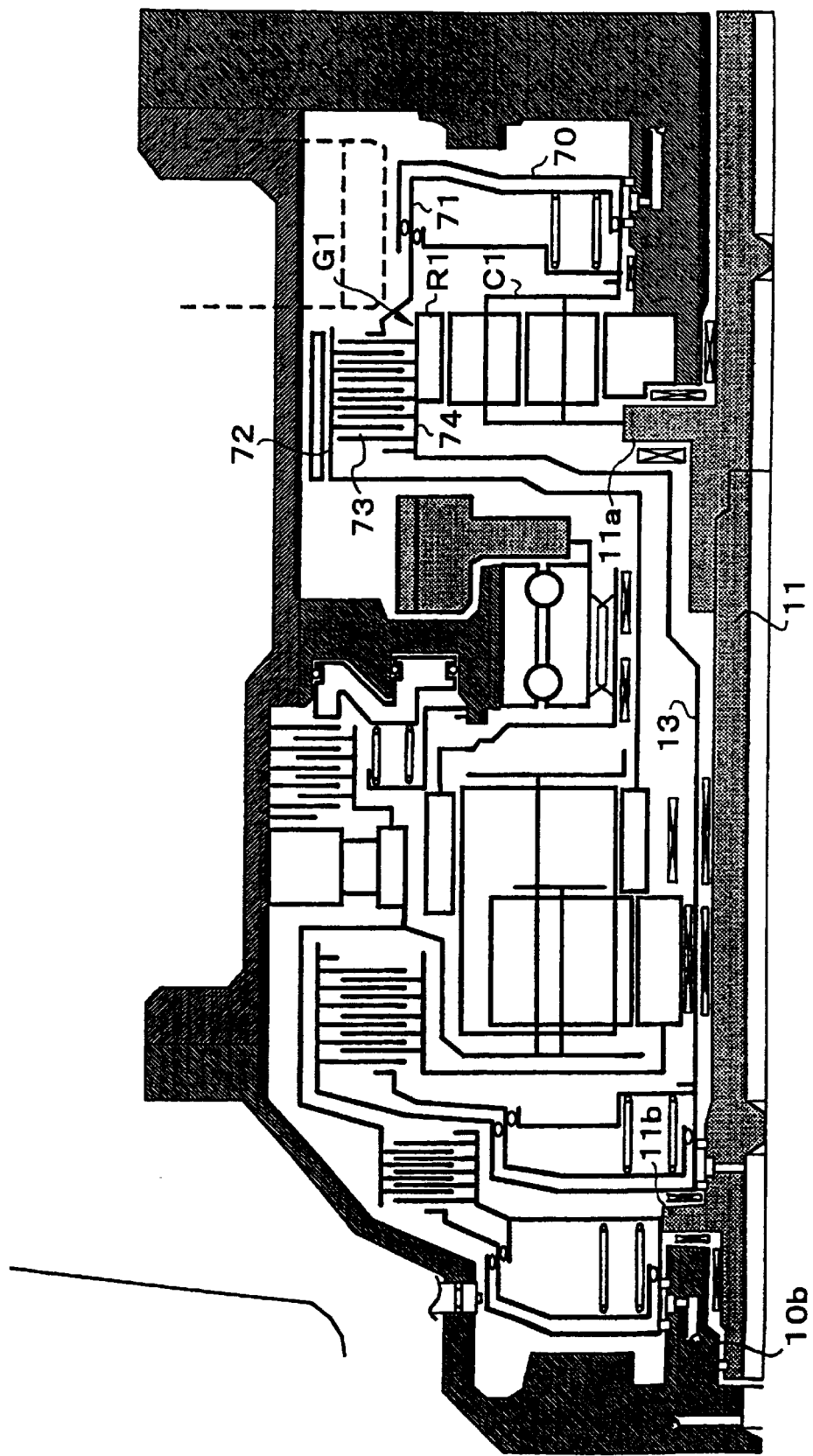
FIG. 6 is a schematic, part cross-sectional view of a main shaft section according to a second embodiment wherein a reduction planetary gear of the gear train is modified.

In the aforementioned first embodiment, because great importance is mainly attached to improvement of gear ratios and gear ratio steps of the speed-change mechanism, the reduction planetary gear G1 has a simple planetary gear structure. However, if great importance is attached to simplification of the coupling relationship between the reduction planetary gear G1 and the planetary gear set G, it is also advantageous that the reduction planetary gear G1 have a double pinion construction. FIG. 6 is a schematic, part cross-sectional view of a speed-change mechanism according to a second embodiment, with the reduction planetary gear G1 having a double pinion construction. Herein, the description will be limited to what is different from the first embodiment. The carrier C1, which is designed as the output element in the first embodiment is connected to the input shaft 11 as an input element. The ring gear R1, which is designed as the input element in the first embodiment, is connected to the decelerated rotation transmitting member 13 as an output element. If such a coupling relationship is adopted, with respect to an input from the rear side of the reduction planetary gear G1, an output is led from the outer space to the rear side. Hence, there is no need to extend the decelerated rotation transmitting member 13 as far as the front side of the reduction planetary gear G1, so that the decelerated rotation transmitting member 13 can be reduced in length.

In accordance with such a change in the coupling relationship, the cylinder 70 of the hydraulic servo 7 for the third clutch C-3 is coupled on the inner side thereof to the carrier C1 of the reduction planetary gear G1. The drum 72 is separated from the hydraulic servo 7. Accordingly, in this case, the engaging operation of the clutch is performed by clamping the frictional member 73 between the backing plate of the hub 74 and the piston 71, so that a thrust load is applied to the decelerated rotation transmitting member 13. The load is transmitted from the rear end of the decelerated rotation transmitting member 13 to the flange 11b on the rear side of the input shaft 11 through a thrust bearing. Through the input shaft 11, the load returns to the cylinder 70 of the hydraulic servo 7 that is fixed to the front-side flange 11a through the carrier C1. In this manner, the thrust load constitutes a closed loop and is balanced without being applied to the transmission casing 10.

Figure 7:
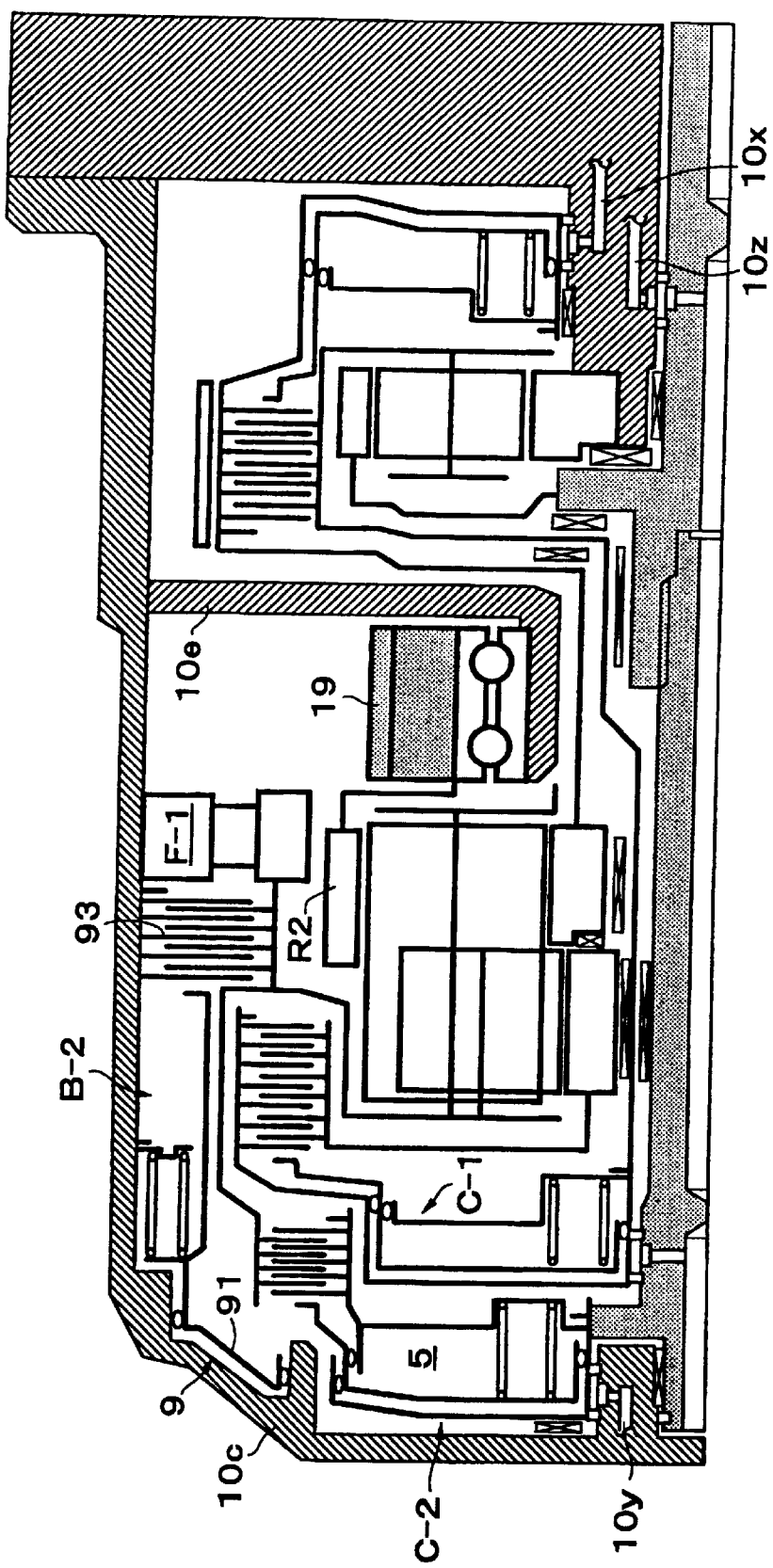
FIG. 7 is a schematic, part cross-sectional view of a main shaft section according to a third embodiment wherein the arrangement of a hydraulic servo for a second brake of the gear train is modified.

Next, a reference will be made to FIG. 7, which is a schematic, part cross-sectional view of a third embodiment wherein the axial length of the transmission has been reduced as a whole. In this embodiment, the hydraulic servo 9 for the second brake B-2 is provided on the outer side of the hydraulic servo 5 for the second clutch C-2 in such a manner as to be built into the rear wall 10c of the transmission casing. In accordance therewith, the frictional member 93 of the second brake B-2 and the one-way clutch F-1 are arranged in an inverted positional relationship to those in the first embodiment. A pressing portion of the piston 91 of the hydraulic servo 9 is elongated toward the frictional member 93 that is positionally distant therefrom, passing through the outer space of the first clutch C-1.

Further, because the hydraulic servo has been changed in position as described above, the outer side behind the support wall 10e becomes free. In accordance therewith, the counter drive gear 19 is directly supported through a bearing on the outer of the boss portion that extends backwards on the inner side of the support wall 10e. Thereby the structure for coupling the ring gear R2 to the counter drive gear 19 is greatly simplified, so that the axial length of the transmission is further reduced. In other respects, the structure of the third embodiment is substantially the same as that of the first embodiment.

Figure 8:
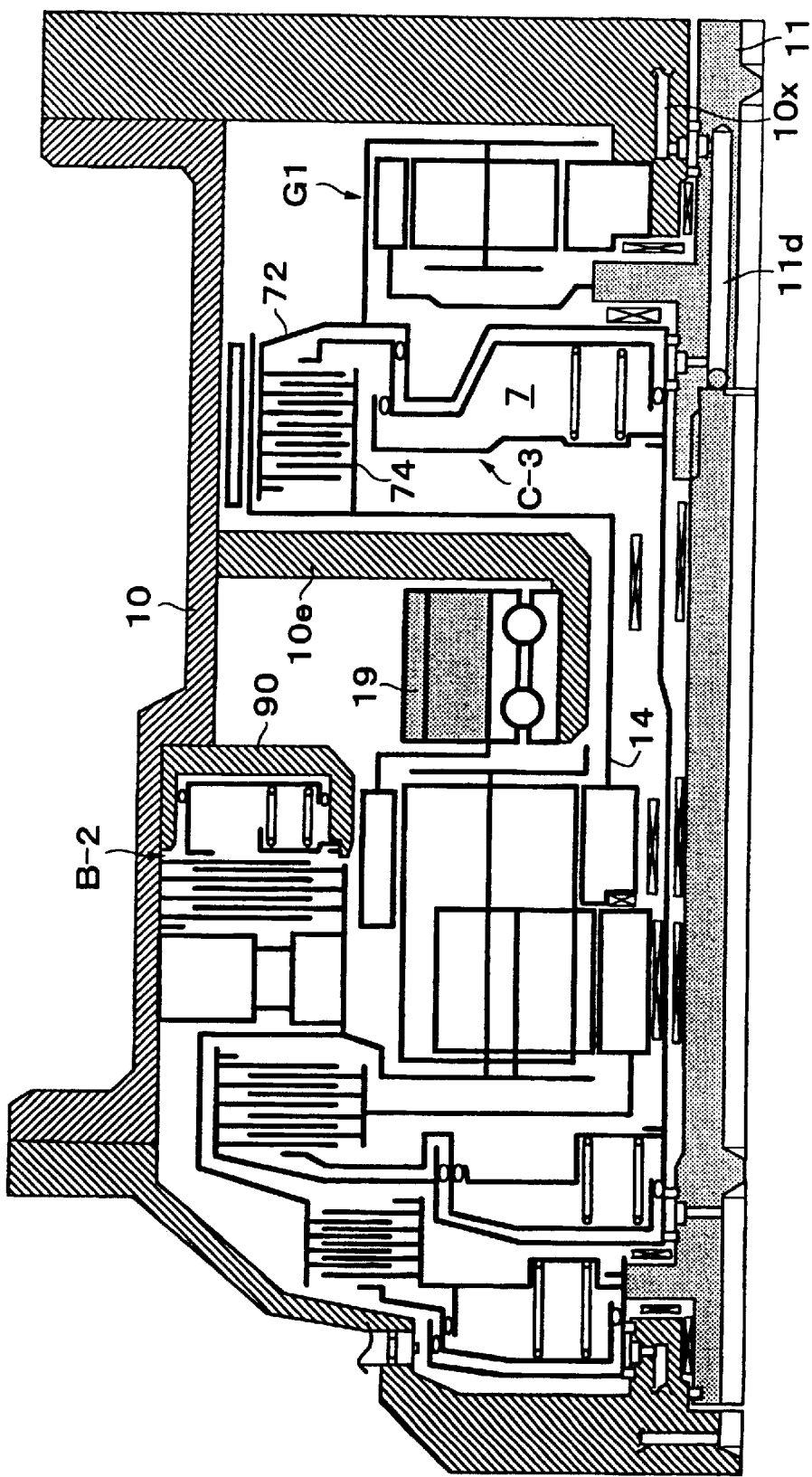
FIG. 8 is a schematic, part cross-sectional view of a main shaft section according to a fourth embodiment wherein a hydraulic servo for a third clutch of the gear train and the reduction planetary gear are positionally switched with respect to each other.

Next, a reference will be made to FIG. 8, which is a schematic, part cross-sectional view of a fourth embodiment wherein the reduction planetary gear G1 and the hydraulic servo 7 for the third clutch C-3 are arranged in an inverted positional relationship to those in the first embodiment. In this embodiment, the hydraulic servo 7 for the third clutch C-3 is supported on the input shaft. In accordance therewith, an in-shaft oil passage 11d connecting the in-casing oil passage 10x with the hydraulic servo 7 is formed in the input shaft 11. Further, the output of the reduction planetary gear G1 is connected to the clutch drum 72, and the clutch hub 74 is connected to the coupling member 14. The brake drum of the first brake B-1, that is coupled thereto, is designed as a special drum covering the outer space of the clutch drum 72.

Further, the fourth embodiment adopts a structure wherein the hydraulic servo cylinder 90 of the second brake B-2 is separately attached to the outer peripheral wall of the transmission casing 10. As is the case with the third embodiment, the fourth embodiment also adopts a structure wherein the counter drive gear 19 is directly supported through a bearing on the outer space of the boss portion that extends backwards on the inner side of the support wall 10c. In other respects, the fourth embodiment is substantially the same as the first embodiment.

Figure 9:
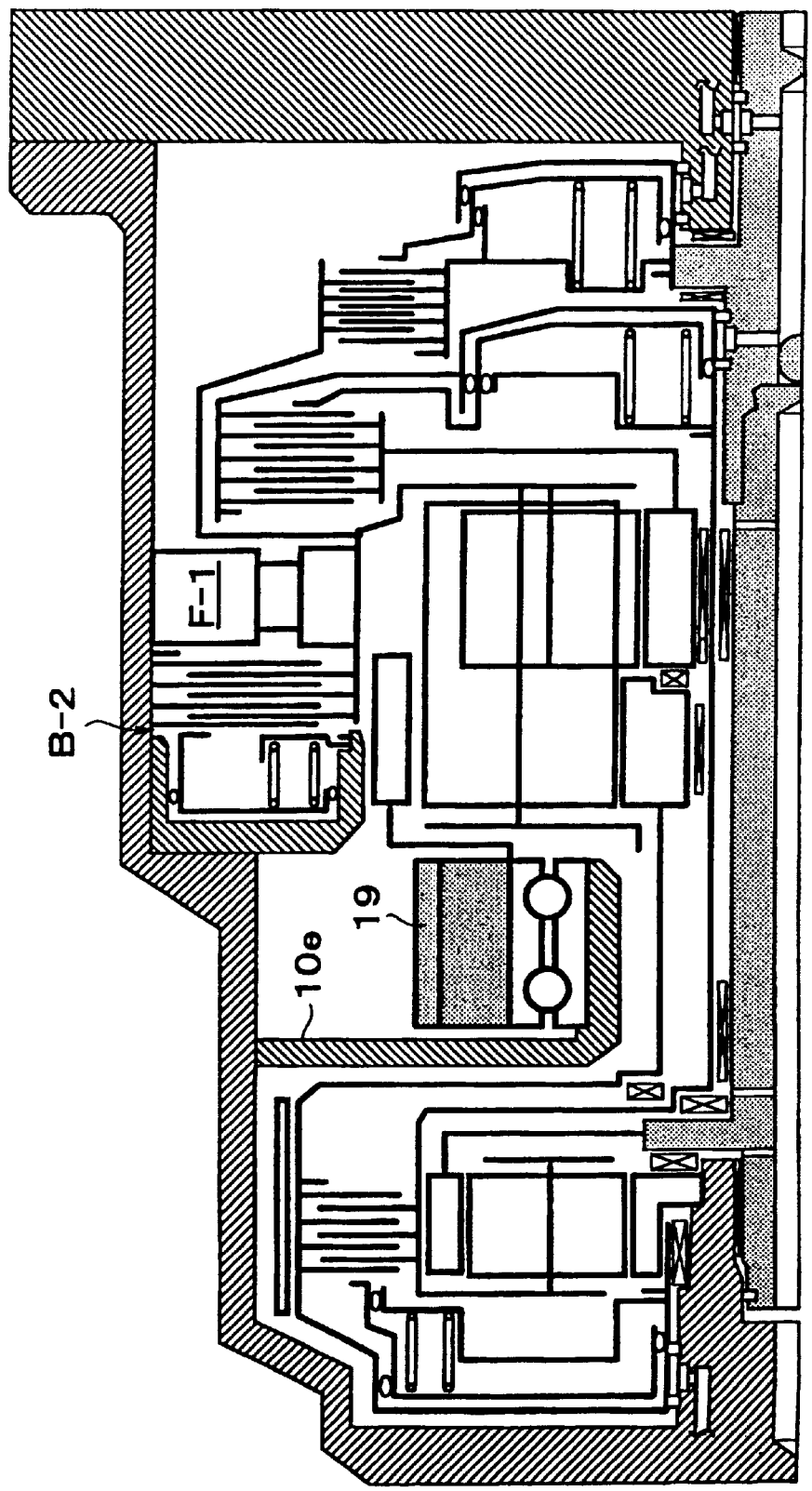
FIG. 9 is a schematic, part cross-sectional view of a main shaft section according to a fifth embodiment wherein the gear train is inverted in fore-to-aft directions with respect to the gear train of the first embodiment.

Next, a reference will be made to FIG. 9, which is a schematic, part cross-sectional view of a fifth embodiment wherein all the components are arranged in an inverted positional relationship to those in the first embodiment as viewed in fore-to-aft directions (in left-and right-directions in the drawing).

As for supporting of the counter drive gear 19 and the structures of the second brake B-2 and the one-way clutch F-1, the fifth embodiment adopts the same structure as in the third embodiment. That is, the counter drive gear 19 is directly supported through a bearing on the outer space of the boss portion that extends forward on the inner side of the support wall 10e.

Figure 10:
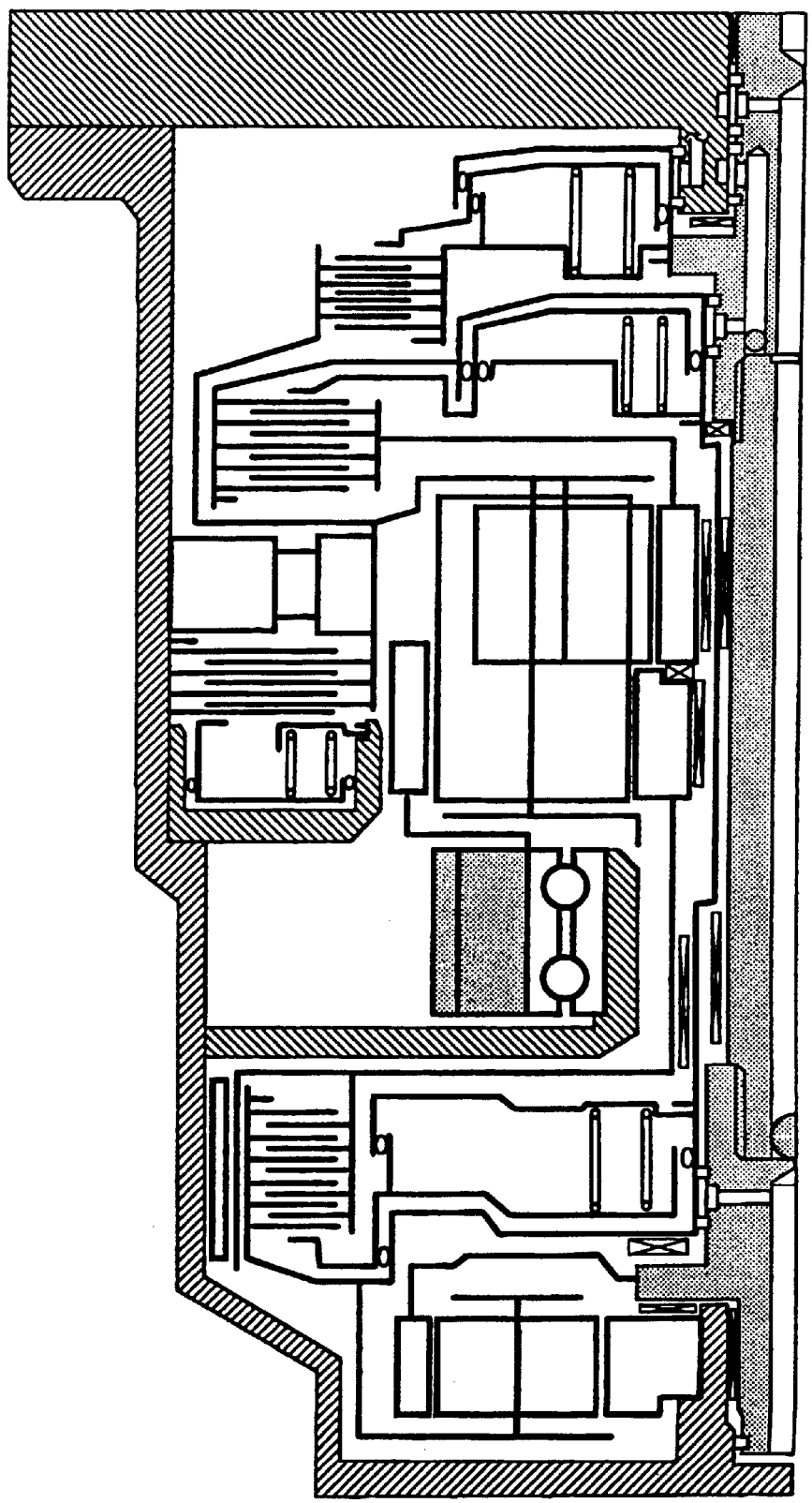
FIG. 10 is a schematic, part cross-sectional view of a main shaft section according to a sixth embodiment wherein the hydraulic servo for the third clutch and the reduction planetary gear are positionally switched with respect to each other as compared to the fifth embodiment.

Next, a reference will be made to FIG. 10, which is a schematic, part cross-sectional view of a sixth embodiment wherein all the components are arranged in an inverted positional relationship to those in the fourth embodiment as viewed in fore-to-aft directions (in left-and-right directions in the drawings). In this case, because the arrangement of the respective elements is obvious by contrast with FIG. 8, illustrating the fourth embodiment, the description thereof will be omitted.

Figure 11:
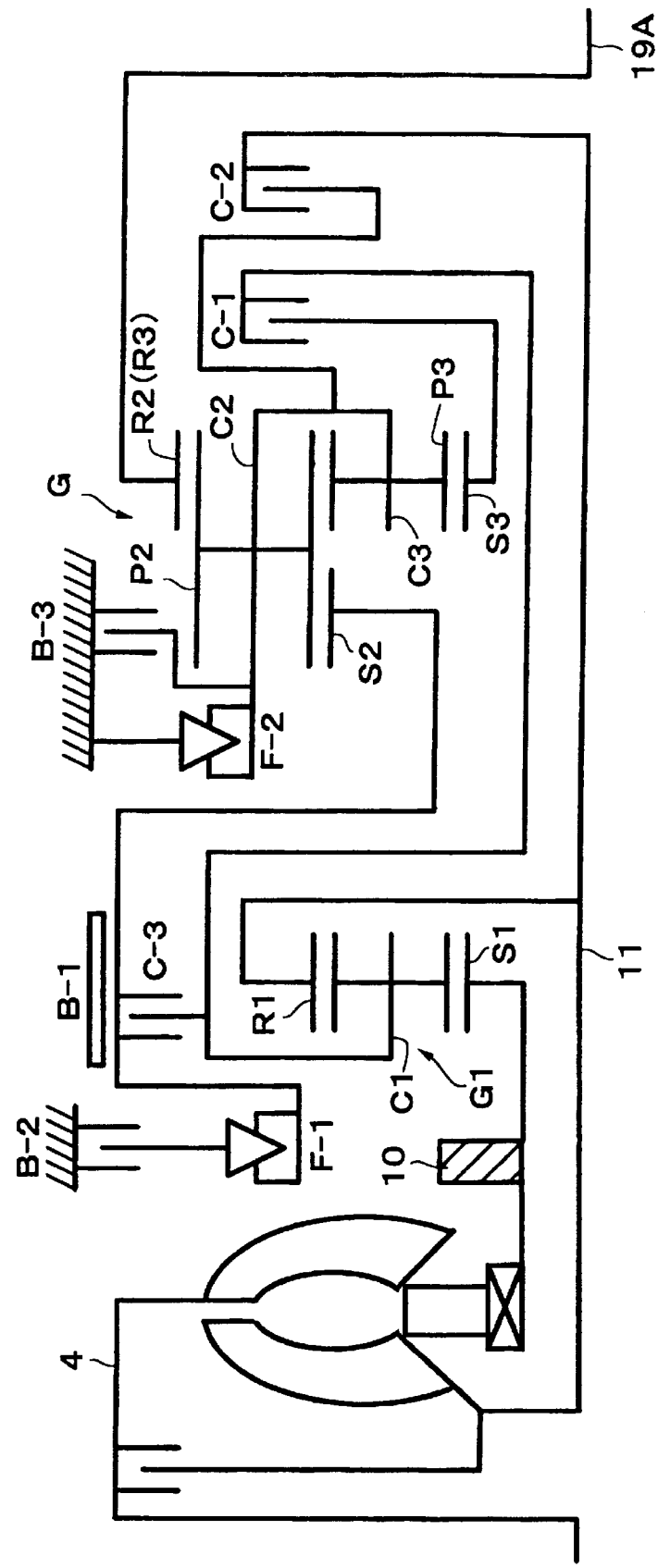
FIG. 11 is a schematic view of a gear train according to a seventh embodiment wherein the invention is applied to a longitudinally mounted vehicular automatic transmission.
Figure 13:
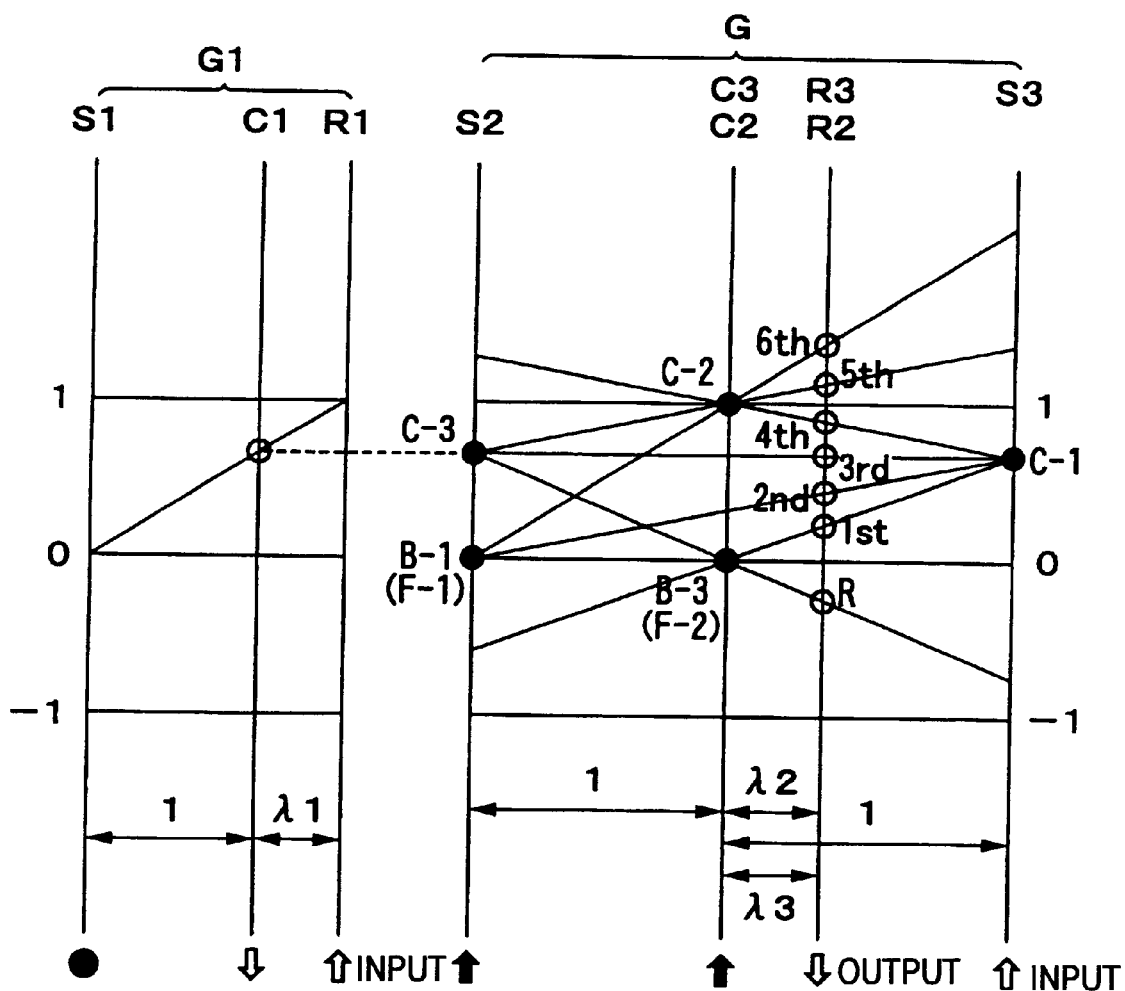
FIG. 13 is a speed diagram of the gear train of the seventh embodiment.

In the aforementioned six embodiments, the invention is applied to a transversely mounted transmission. However, the invention can also be applied to a longitudinally mounted transmission (with respect to the longitudinal axis of the vehicle) for a front-engine rear-drive (FR) vehicle. FIG. 11 is a schematic diagram of a seventh embodiment wherein the invention is applied to the longitudinally mounted transmission. In this case, FIG. 12 shows the relationship among gear ratios and the gear ratio steps, and FIG. 13 is a speed diagram. The speed-change mechanism of this embodiment is also essentially the same as those of the aforementioned respective embodiments. However, the speed-change mechanism of this embodiment is different from them in two respects because of the longitudinally mounted transmission. First, the restriction on the axial length is less important in comparison with the case of the transversely mounted transmission. Therefore, a combination of the one-way clutch and the brake, which is the equivalent of the one-way clutch F-1 provided in addition the second brake B-2 as in the foregoing embodiments, is also provided for the first brake B-1 with a view to simplifying hydraulic pressure control at the time of a speed-change transition, especially at the time of an interchange speed-change operation. Secondly, the ring gear R2, designed as an output element, is connected to an output shaft 19A that is coaxial with the input shaft 11.

In accordance with the addition of such components, the second brake and the one-way clutch are designated differently from those in the foregoing embodiments. For this reason, in disregard for prolixity, the structure of the gear train will again be described with the intention of preventing confusion.

Referring to FIG. 11, according to the structure of the transmission, a torque converter 4, provided with a lock-up clutch connected to an engine (not shown), is arranged at the foremost portion thereof, and a speed-change mechanism that establishes six forward speeds and one backward speed is arranged at the rear portion thereof.

As is the case with the foregoing embodiments, a planetary gear set G, which is a main constituent of the transmission, has a stricture of a Ravigneaux type gear set, which is composed of a pair of sun gears S2, S3, a ring gear R2(R3), a pair of pinion gears P2, P3 and a carrier C2(C3). The diameter of the sun gear S2 is larger than the diameter of the sun gear S3. The pinion gears P2, P3 mesh with each other. One of the pinion gears P2, P3 meshes with the large-diameter sun gear S2 and the ring gear R2(R3), and the other of the pinion gears P2, P3 meshes with the small-diameter sun gear S3. The carrier C2(C3) supports the pinion gears P2, P3. A first speed-change element of the planetary gear shift G, namely, the small-diameter sun gear S3 is connected to a first clutch C-1. A second speed-change element, namely, the large-diameter sun gear S2 is connected to a third clutch C-3 and can be engaged to an automatic transmission casing 10 by a first brake B-1 composed of a band brake. Furthermore, the large-diameter sun gear S2 can also be engaged to the automatic transmission casing 10 by a one-way clutch F-1 and a brake B-2 that are parallel to the first brake B-1. The carrier C2(C3), which is a third speed-change element, is connected to an input shaft 11 through a second clutch C-2 and can be engaged to the transmission casing 10 by a second brake B-3. In addition, the carrier C2(C3) can be engaged to the transmission casing 10 by a one-way clutch F-2 such that the carrier C2(C3) can rotate in a single direction. A fourth speed-change element, the ring gear R2(R3) is connected to an output shaft 19A.

Likewise, a reduction planetary gear G1 is composed of a simple planetary gear. A ring gear R1, which is designed as an input element of the reduction planetary gear G1, is connected to the input shaft 11. A carrier C1, which is designed as an output element of the reduction planetary gear G1, is connected to the small-diameter sun gear S3 through the first clutch C-1 and is connected to the large-diameter sun gear S2 through the third clutch C-3. A sun gear S1, which is designed as a stationary element for gaining a reaction force, is fixed to the transmission casing 10.

FIG. 12 is an engagement chart showing the relationships among engagement and release of the respective brakes and one-way clutches and established speed-change stages in the case of the automatic transmission. A white circle in the engagement chart represents engagement, black represents release, a white triangle represents engagement only at the time of engine braking, and a black dot represents engagement that does not directly affect establishment of a speed-change stage. FIG. 13 is a speed diagram showing the relationship among speed-change stages established through engagement of the respective clutches and brakes (black dots represent engagement thereof) and rotational speed ratios of the respective speed-change elements at that time.

As can be understood by referring to FIGS. 12 and 13, a first speed (1st) is established by engaging the clutch C-1 and the brake B-3 (In this embodiment, as can be understood by referring, to the operational chart, the one-way clutch F-2 is automatically engaged instead of engaging the brake B-3. Although this embodiment uses different designations, as has already been described, with reference to the relationship between the brake B-2 and the one-way clutch F-2 in the foregoing embodiments, why the one-way clutch F-2 is engaged and why the engagement of the one-way clutch F-2 corresponds to the engagement of the brake B-3 can be understood as occurring in a substantially identical manner). In this case, the rotation that has been decelerated from the input shaft 11 through the reduction planetary gear G1 is inputted to the small-diameter sun gear S3 through the clutch C-1. A reaction force is gained from the carrier C2 that has been stopped by engaging the one-way clutch F-2, and a decelerated rotation with a maximum deceleration ratio of the ring gear R2 (R3) is outputted to the output shaft 19A.

Next, a second speed (2nd) is established by engaging the one-way clutch F-1 and the brake B-2. The engagement of the one-way clutch F-1 corresponds to the engagement of the first clutch C-1 and the first brake B-1, and the engagement of the second brake B-2 makes the engagement of the one-way clutch F-1 effective (It will be described later in detail why the engagement of the one-way clutch F-1 and the second brake B-2 corresponds to the engagement of the brake B-1). In this case, the rotation that has been decelerated from the input shaft 11 through the reduction planetary gear G1 is inputted to the small-diameter sun gear S3 through the first clutch C-1. A reaction force is gained from the large-diameter sun gear S2 that has been stopped by engaging the second brake B-2 and the one-way clutch F-1, and a decelerated rotation of the ring gear R2(R3) is outputted to the output shaft 19A. At this moment, as can be seen from FIG. 13, the deceleration ratio is smaller than that of the first speed (1st).

Further, a third speed (3rd) is established by simultaneously engaging the first clutch C-1 and the third clutch C-3. In this case, the rotation that has been decelerated from the input shaft 11 through the reduction planetary gear G1 is simultaneously inputted to the large-diameter sun gear S2 and the small-diameter sun gear S3 through the first clutch C-1 and the third clutch C-3. The planetary gear set G then assumes a direct-coupled state. Thus, the rotation of the ring gear R2(R3), which is equal to the rotation inputted to both the sun gears, is outputted to the output shaft 19A, as a rotation that has been decelerated with respect to the rotation of the input shaft 11.

Furthermore, a fourth speed (4th) is established by simultaneously engaging the first clutch C-1 and the second clutch C-2. In this case, on one hand, the rotation that has been decelerated from the input shaft 11 through the reduction planetary gear G1 is inputted to the sun gear S3 through the first clutch C-1. On the other hand, the non-decelerated rotation that has been input from the input shaft 11 through the second clutch C-2 is inputted to the carrier C3. An intermediate rotation of the two rotations thus inputted is outputted to the output shaft 19A as a rotation of the ring gear R2(R3) that has been slightly decelerated with respect to the rotation of the input shaft 11.

Next, a fifth speed (5th) is established by simultaneously engaging the second clutch C-2 and the third clutch C-3. In this case, on one hand, the rotation that has been decelerated from the input shaft 11 through the reduction planetary gear G1 is inputted to the sun gear S2 through the third clutch C-3. On the other hand, the nondecelerated rotation that has been inputted from the input shaft 11 through the second clutch C-2 is inputted to the carrier C2. Thus, a rotation of the ring gear R2(R3) that has been slightly accelerated with respect to the rotation of the input shaft 11 is outputted to the output shaft 19A.

Then a sixth speed (6th) is established by engaging the second clutch C-2 and the first brake B-1. In this case, a non-decelerated rotation is inputted only to the carrier C2 from the input shaft 11 through the second clutch C-2. A further accelerated rotation of the ring gear R2(R3), which gains a reaction force from the sun gear S2 that has been stopped by engaging the first brake B-1, is outputted to the output shaft 19A.

A reverse speed (R) is established by engaging the third clutch C-3 and the third brake B-3. In this case, the rotation that has been decelerated from the input shaft 11 through the reduction planetary gear G1 is inputted to the sun gear S2 through the third clutch C-3. A reverse rotation of the ring gear R2(R3), which gains a reaction force from the carrier C2 that has been stopped by engaging the third brake B-3, is outputted to the output shaft 19A.

As described above briefly, the relationship between the one-way clutch F-1 and the first and the second brakes B-1, B-2 will not be described. In this case, the direction in which the one-way clutch F-1 connected to the sun gear S2 is engaged is made coincident with the direction in which the sun gear S2 supports a reaction torque at the time of the second speed. Thereby the one-way clutch F-1 can perform substantially the same function as engagement of the first brake B-1. Unlike the carrier C2(C3), the sun gear S2 is a speed-change element that is not only engaged to achieve an engine braking effect at the time of the second speed but also stopped to establish the sixth speed. Therefore, the first brake B-1 becomes necessary. Further, as can also be seen from the speed diagram in FIG. 13, the sun gear S2 rotates reversely with respect to the direction of input rotation upon establishment of the first speed (1st). However, in the case of the third to sixth speed-change stages, the sun gear S2 rotates in the same direction as the direction of input rotation. Accordingly, the one-way clutch F-1 cannot directly be connected to the stationary member. Thus, the one-way clutch F-1 is arranged in series with the second brake B-2 so as to allow effectiveness of an engaged state to be controlled.

The respective speed-change stages that are thus established constitute good speed steps with a substantially equal interval for the respective speed-change stages. This is qualitatively apparent from the speed diagram of FIG. 13 by referring to the intervals between the white circles indicative of speed ratios of the ring gear R2(R3) in up-and-down directions. If this relationship is quantitatively represented by setting values, the gear ratios shown in FIG. 12 are obtained. In this case, the ratio $\lambda 1$ of the number of teeth of the sun gear S1 of the reduction planetary gear G1 to the number of teeth of the ring gear R1 is set to 0.556, the ratio $\lambda 2$ of the number of teeth of the sun gear S2, which is the large-diameter sun gear of the planetary gear set G, to the number of teeth of the ring gear R2 (R3) is set to 0.458, and the ratio $\lambda 3$ of the number of teeth of the sun gear S3, which is the small-diameter sun gear, to the number of teeth of the ring gear R3 is set to 0.375. The gear ratio width is 6.049.

Figure 14:
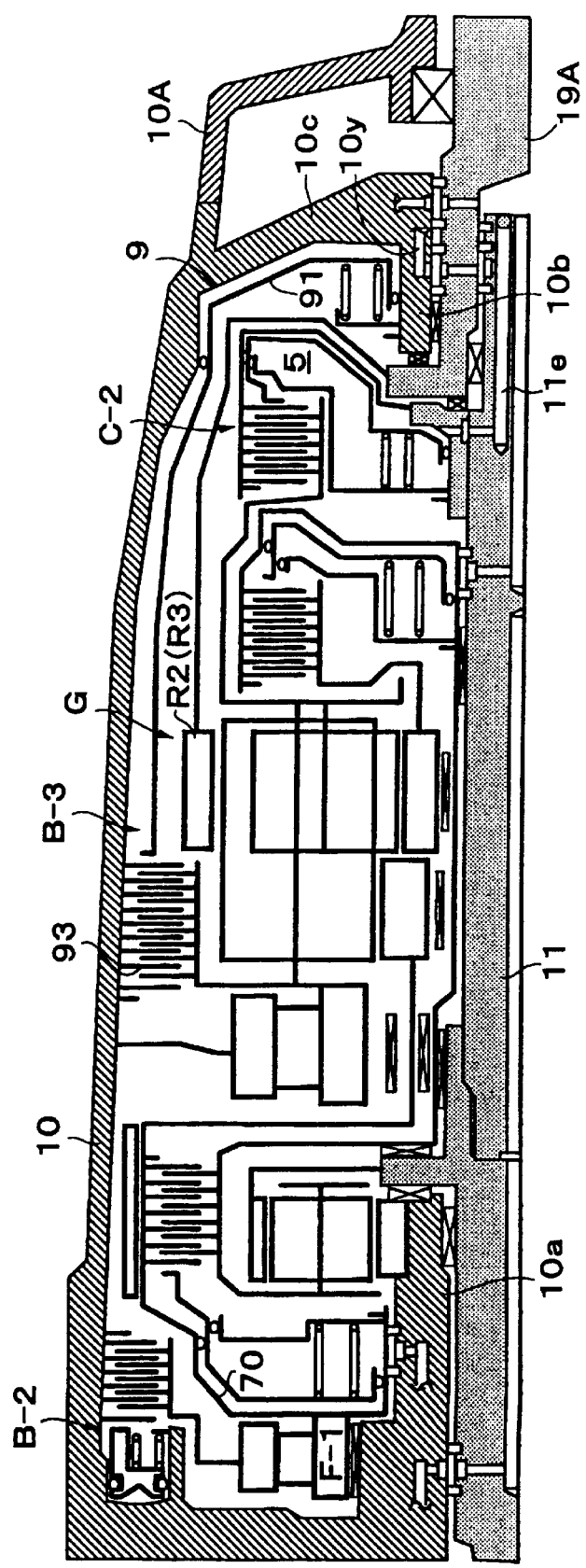
FIG. 14 is a schematic, part cross-sectional view of the gear train of the seventh embodiment.

Next, a reference will be made to FIG. 14, which is a schematic, part cross-sectional view showing the structure of the automatic transmission more specifically. The respective components that have been described above with reference to the schematic diagram are denoted by the same reference numerals and will not be described again. However, the details that cannot be understood from the schematic diagram will now be described. First, in this embodiment, the input shaft 11 is supported on the front end side (left in figure) thereof by a boss portion 10a of the transmission casing by a bearing, and is supported on the rear end side (right in figure) thereof by a rear-side boss portion 10b of the transmission casing through the output shaft 19A, which is coaxial with the input shaft 11. Hence, the rear end portion of the input shaft 11 is reduced in diameter, fitted onto a shaft hole in the output shaft 19A, and supported by a bearing. The rear end portion of the input shaft 11 is rotatably supported through the output shaft 19A, by the rear-side boss portion 10b, which is elongated from a rear end wall portion 10c of the transmission casing 10.

The front end portion of the output shaft 19A is rotatably supported by the rear-end boss portion 10b of the transmission casing 10 through a roller bearing, and the rear end portion of the output shaft 19A is rotatably supported through a ball bearing by an extension housing 10A, which is fixed to the rearmost portion of the transmission casing 10. A flange at the front end of the output shaft serves as a coupling portion to the ring gear R2(R3) designed as an output element of the planetary gear set G. The flange is connected to the ring gear R3 through a drum-like member.

The transmission adopts a structure wherein there is no support at the intermediate portion of the transmission casing 10. A hydraulic servo 9 constituting the third brake B-3 is incorporated in a cylinder, which is an annular space surrounded by an outer peripheral wall on the rear side of the transmission casing 10, the rear end wall portion 10c and the rear-side boss portion 10b. The third brake B-3 functions in the same manner as the second brake B-2 in the earlier described embodiments. Thus, for this embodiment it is considered a second brake. Because of this arrangement of the hydraulic servo 9, a piston 91 of the hydraulic service 9 is spaced far apart from a frictional member 93 that is arranged in front of the outer space of the planetary gear set G. Hence, the piston 91 of the hydraulic servo 9 has a pressing portion that is elongated along the outer space of the first and second clutches C-1, C-2 and the ring gear R2(R3) of the planetary gear set so as to reach the end portion of the frictional member 93.

In association with the coupling portion to the output shaft 19A of the ring gear R2(R3) of the aforementioned planetary gear set planetary gear set G, and with the arrangement wherein the hydraulic servo 9 for the third brake B-3 is incorporated in the annular space on the rear side of the transmission casing 10, a hydraulic servo 5 for the second clutch C-2 cannot be arranged on the rear-side boss portion 10b. Therefore, the embodiment adopts a structure wherein the hydraulic servo 5 is directly supported on the outer space of the rear end portion of the input shaft 11. In accordance with the change in structure, an in-shaft oil passage 11e for servo pressure is formed in the rear portion of the input shaft 11 so as to supply the hydraulic servo 5 with a hydraulic pressure. An oil passage 10y in the boss portion communicates with the oil passage 11e through an oil passage extending across the output shaft 19A.

In this embodiment, the one-way clutch F-1 and the second brake B-2 are added (and are functionally a third brake or engage means). The one-way clutch F-1 has a structure wherein an inner race thereof is fixed to a cylinder 70 of the third clutch C-3 and an outer race thereof is integrated with a hub of the second brake B-2. The one-way clutch F-1 is arranged in front of the third clutch C-3, namely, at the foremost portion of the speed-change mechanism. The second brake B-2, which engages the outer race to the transmission casing 10, is a multi-plate brake that has a frictional member supported by the outer race through engagement and a frictional member, separator plates, supported by an inner side spline of the transmission casing 10 through engagement. A hydraulic servo for the second brake B-2 is equipped with a piston that is slidably fitted into a cylinder composed of a front end wall portion of the transmission casing 10 and with a return spring that abuts on the piston and is axially retained by the front end wall portion of the transmission casing 10.

According to the seventh embodiment having such a structure, the frictional member 93 of the third brake B-3 is arranged on the outer side that lacks the ring gear of the planetary gear set. The section on the outer space of the planetary gear set G, which is intrinsically a dead space, can effectively be used for arrangement of the frictional member 93. Therefore, the transmission can be shortened in the axial direction and in the radial direction.

Furthermore, the third brake B-3 has the frictional member 93 which is a multi-plate frictional member. The hydraulic servo 9 for the third brake B-3 is arranged at the rearmost portion of the transmission. Therefore, the rear end wall portion of the automatic transmission casing 10 can be used as a hydraulic servo cylinder. Unlike the case of a band brake, the hydraulic servo does not project out of the transmission casing, so that the space for a passenger compartment is not reduced. In the case of a band brake, if the band brake is engaged, a force in a certain direction is applied to the carrier on which the band brake is arranged. This adversely affects centering and supporting of the planetary gear set or supporting or centering of the input shaft which supports the planetary gear set. Hence, it is necessary to enlarge bushes and bearings for supporting the input shaft and the planetary gear set or to enlarge the input shaft itself. However, since the third brake B-3 is a multi-plate brake in this embodiment, the aforementioned measures need not to be taken. Thus, it is possible to realize a compact automatic transmission.

Figure 15:
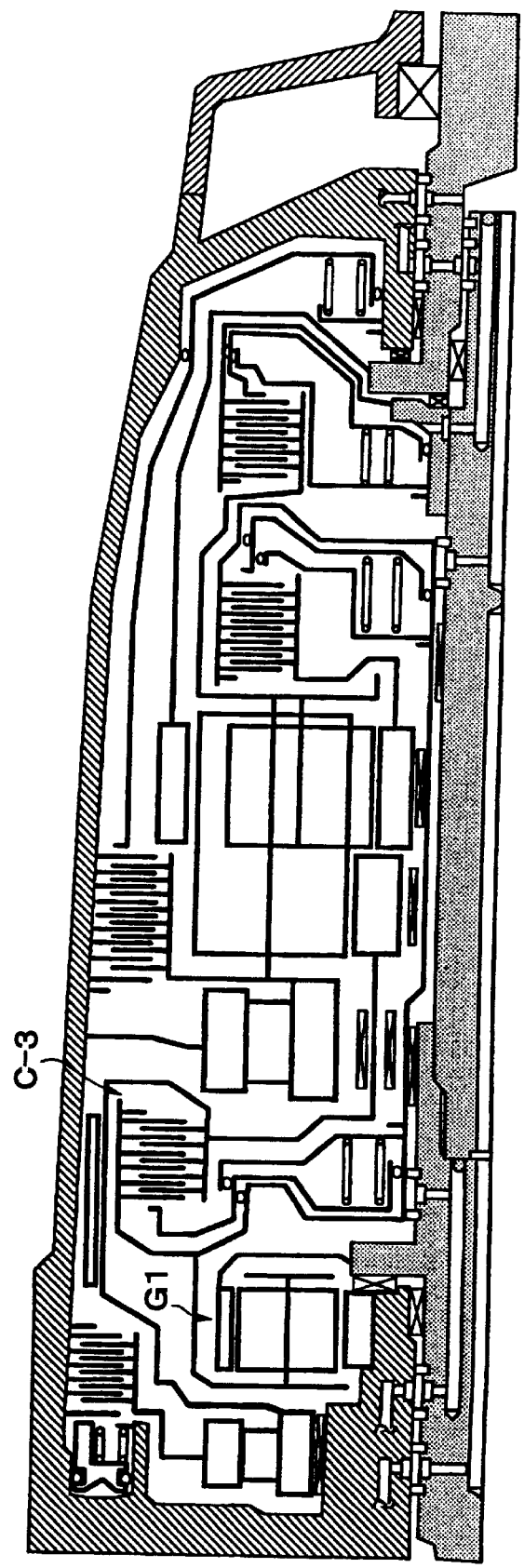
FIG. 15 is a schematic, part cross-sectional view of the gear train according to an eighth embodiment wherein the third clutch and the reduction planetary gear are positionally switched with respect to each other as compared to the seventh embodiment.

Also in the case where the invention is applied to such a longitudinally mounted transmission, various modifications are possible as in the case of a transversely mounted transmission. Examples of such modifications will be described hereinafter. First of all, a reference will be made to FIG. 15, which is a schematic, part cross-sectional view of an eighth embodiment wherein the third clutch C-3 and the reduction planetary gear G1 arc positionally switched with respect to each other. In this case, the mutual relationship between the third clutch C-3 and the reduction planetary gear G1, the relationship of supporting the third clutch C-3 and the reduction planetary gear G1, the relationship of coupling of the third clutch C-3 and the reduction planetary gear G1 to the planetary gear set G, and the supply of a hydraulic pressure to the hydraulic servo 7 for the third clutch C-3 are the same as in the fourth embodiment shown in FIG. 8.

Figure 16:
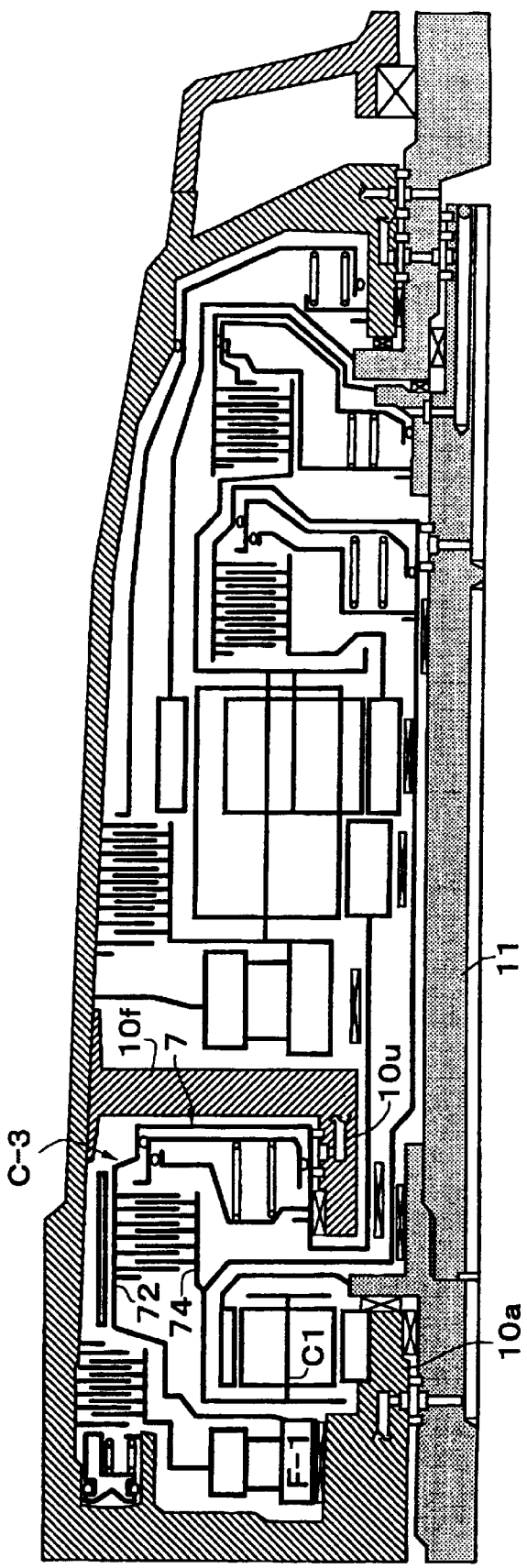
FIG. 16 is a schematic sectional view of the gear train according to a ninth embodiment wherein the hydraulic servo for the third clutch is supported on a support unlike the case of the eighth embodiment.

Next, reference will be made to FIG. 16, which shows a ninth embodiment wherein despite substantially the same structure as in the eight embodiment, the hydraulic servo 7 for the third clutch C-3 is supported on a support 10f. In this embodiment, the hydraulic servo 7 for the third clutch is supported through a bearing by an outer space of a boss portion extending forward from the support 10f. In accordance therewith, the hydraulic servo 7 has been changed in arrangement so as to be directed forwards. Then, the front end of the drum 72, connected in a row arrangement to the outer side of the cylinder 70 of the hydraulic servo 7, is elongated and connected to the inner race of the one-way clutch F-1, which has not been changed in position. Because of this coupling relationship, the outer side of the reduction planetary gear G1 is closed by the clutch drum 72. Hence, the carrier C1 of the reduction planetary gear G1 is connected to the side of the clutch hub 74.

In the case where this arrangement is adopted, because of the arrangement of the support 10f, it inevitably increases the axial length of the transmission correspondingly. However, because the hydraulic servo 7 is supported on the support 10f, it is possible to supply a hydraulic pressure from an in-support oil passage 10u to the hydraulic servo 7 without the aid of the input shaft 11. Thus, the arrangement of the oil passages in the input shaft and the front-side boss portion 10a can be simplified. Especially, this arrangement serves to reduce the length of the oil passage of the front-side boss portion 10a that is designed as an elongated portion of a body of an oil pump where oil passages normally extend in an intricate manner. Therefore, this arrangement is effective in its ability to enhance a degree of freedom in the structure of oil passages in the oil pump body.

Figure 17:
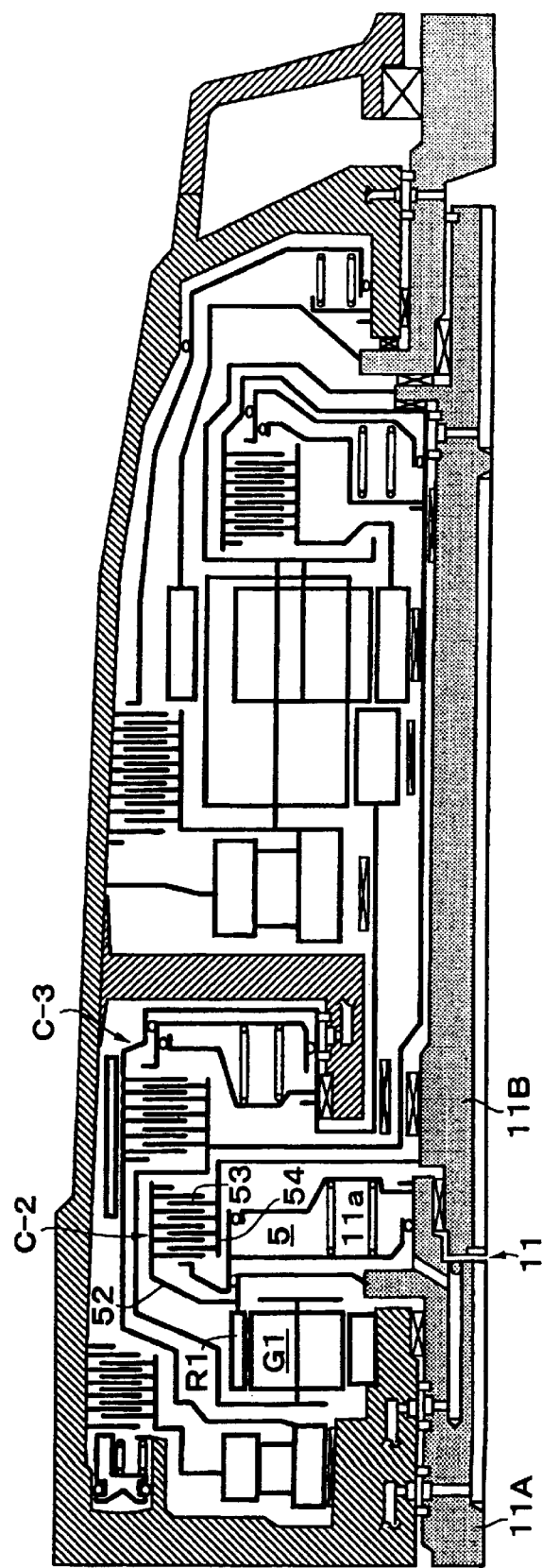
FIG. 17 is a schematic sectional view of the gear train according to a tenth embodiment wherein the second clutch is shifted in position as compared to the ninth embodiment.

Next, reference will be made to FIG. 17, which shows a tenth embodiment wherein despite substantially the same structure as in the nine embodiment, the second clutch C-2 has been shifted to a location between the reduction planetary gear G1 and the third clutch C-3. The embodiment is different from the foregoing respective embodiments in that the input shaft 11 is divided into two portions. That is, power transmission is carried out in such an arrangement that the input shaft 11 extends across the second clutch C-2. More specifically, the input shaft 11 is divided into front and rear portions at a location where the hydraulic servo 5 for the second clutch C-2 is arranged. The rear portion 11B of the input shaft 11 is fitted into the front portion 11A of the input shaft 11 and supported by a bearing. The hydraulic servo 5 for the second clutch C-2 is immediately behind the flange 11a that couples the input shaft 11 to the ring gear R1 of the reduction planetary gear G1, with the outer of the front portion 11A of the input shaft and the coupling member serving as a cylinder. The frictional member 53 is arranged on the outer space of its own hydraulic servo 5 such that the outer space of the frictional member 53 is supported by the drum 52 fixed to the coupling member and the hub 54 supporting the inner space of the frictional member 53 is fixed to the front end of the rear portion 11B of the input shaft.

As is apparent by referring to the engagement chart in FIG. 12, the rear portion 11B of the input shaft is stopped on the side of low-speed stages, namely, the first through third speed stages that do not necessitate power transmission through engagement of the second clutch C-2. Thus, the tenth embodiment is advantageous in its capability to reduce the weight and inertial force of the members that rotate in response to input rotation.

Figure 18:
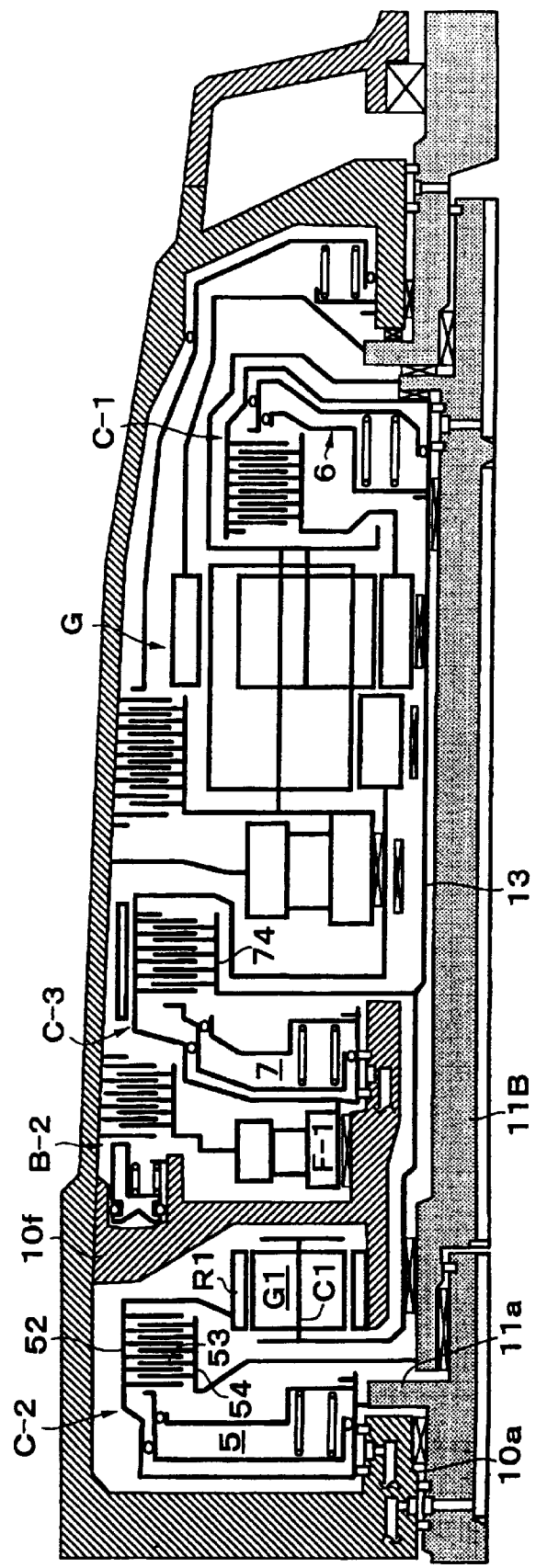
FIG. 18 is a schematic sectional view of the gear train according to an eleventh embodiment wherein the first and third clutches are arranged adjacent to the planetary gear set in a gradual manner.

Finally, reference will be made to FIG. 18, which shows an eleventh embodiment wherein the first and third clutches C-1, C-3 are arranged adjacent to the planetary gear set in a gradual manner. In this embodiment, the reduction planetary gear G1 and the second clutch C-2 are arranged at the foremost portion of the speed-change mechanism. To be more specific, the second clutch C-2 is arranged such that the hydraulic servo 5 therefor is also supported at the front-side boss portion 10a. The reduction planetary gear G1 is supported on the outer space of the boss portion extending forwards from the support 10f. The hydraulic servo 5 for the second clutch C-2 is connected to the flange 11a of the input shaft 11, and the leading end side on the side of the opening of the clutch drum 53 is connected to the ring gear R1 of the reduction planetary gear G1. The frictional member 53 of the second clutch C-2 is arranged at a substantially intermediate axial location between the hydraulic servo 5 and the reduction planetary gear G1. The frictional member 53 of the second clutch C-2 is arranged at a substantially intermediate axial locate between the hydraulic servo 5 and the reduction planetary gear G1. The clutch hub 54 is connected to the front end of the rear portion 11B of the input shaft through a space between the hydraulic servo 5 and the reduction planetary gear G1.

The however servo 7 for the third clutch C-3 and the one-way clutch F-1 are supported on the outer space of the boss portion that extends backwards on the inner side of the support 10f. The hydraulic servo for the second brake B-2 is incorporated in an annular space on the outer side of the support 10f. The carrier C1, which is designed as an output element of the reduction planetary gear G1, is connected to the clutch hub 74 of the third clutch C-3 through the inner space of the support 10f. The hub 74 is connected to the hydraulic servo 6 for the first clutch C-1 through the decelerated rotation transmitting member 13.

In addition to the fact that the length of the high-torque transmitting path on the clutch output side can be minimized by arranging the first and third clutches adjacent to the planetary gear set G in a gradual manner as described above, the eleventh embodiment has the following advantages. That is, the hydraulic supply passages for the three clutches can be distributed in good balance, and the respective hydraulic servos can be supplied with hydraulic pressures and lubricating oil without providing a plurality of in-shaft oil passages that are parallel to the input shaft 11.

The embodiments of the invention in which modifications have been made in form, arrangement and coupling relationship of the components have been described in detail. It is to be noted herein, however, that these embodiments are just mere representative examples, and that the invention should not be limited thereto. That is, the invention can be implemented with various modifications in structure within the scope as defined in respective claims.

What is claimed is:

1. A vehicular automatic transmission, comprising:
    a planetary gear set receiving a decelerated rotation and a non-decelerated rotation as inputs and outputting a plurality of speed-change rotations;
    a reduction planetary gear arranged axially in juxtaposition with the planetary gear set;
    an input shaft passing through an inner side of the planetary gear set; and
    a first clutch and a third clutch of three clutches which transmit the decelerated rotation through at least the reduction planetary gear to two different elements of the planetary gear set when engaged respectively, wherein the reduction planetary gear and the third clutch are arranged on one side of the planetary gear set and the first clutch is arranged on the other side of the planetary gear set.

2. The vehicular automatic transmission according to claim 1, wherein an output element of the reduction planetary gear passes through the inner space of the planetary gear set and is connected to the first clutch.

3. The vehicular automatic transmission according to claim 1, wherein the planetary gear set is equipped with at least four speed-change elements;
    the first speed-change element is connected to the reduction planetary gear by the first clutch in an engageable and disengageable manner;
    the second speed-change element is connected to the reduction planetary gear by the third clutch in an engageable and disengageable manner and can be engaged to a transmission casing by first engage means;
    the third speed-change element is connected to the input shaft by a second clutch of the three clutches in an engageable and disengageable maimer and can be engaged to the transmission casing by second engage means; and
    the fourth speed-change clement is connected to an output member.

4. The vehicular automatic transmission according to claim 2, wherein a clutch drum of the first clutch is arranged such that an opening side thereof faces the planetary gear set and is connected to an output member of the reduction planetary gear.

5. The vehicular automatic transmission according to claim 2, wherein a frictional member of the third clutch is arranged on an outer space of the reduction planetary gear; and
    a clutch drum of the third clutch is connected to an input member for the planetary gear set.

6. The vehicular automatic transmission according to claim 5, wherein one element of the reduction planetary gear is constantly fixed to a boss portion that is elongated from the transmission casing; and
    a hydraulic servo for the third clutch is arranged on a boss portion on one side of the reduction planetary gear.

7. The vehicular automatic transmission according to claim 2, wherein the hydraulic servo for the third clutch is arranged on an input shaft on the other side of the reduction planetary gear; and the clutch drum of the third clutch is connected to the output member of the reduction planetary gear.

8. The vehicular automatic transmission according to claim 7, wherein the frictional member of the third clutch is arranged on an outer space side of the hydraulic servo for the third clutch.

9. The vehicular automatic transmission according to claim 3, wherein the second clutch, which couples the input shaft to the other speed-change element of the planetary gear set in an engageable and disengageable manner, is arranged on the other side of the planetary gear set with respect to the first or third clutch.

10. The vehicular automatic transmission according to claim 9, wherein the frictional members of the first through third clutches are arranged on outer peripheries of other rotational members.

11. The vehicular automatic transmission according to claim 10, wherein the frictional member of the first clutch is arranged on the outer space of the planetary gear set;

the frictional member of the second clutch is arranged on the outer space of the hydraulic servo for the first clutch; and the frictional member of the third clutch is arranged on the outer space of the reduction planetary gear.

12. The vehicular automatic transmission according to claim 11, wherein a hydraulic servo for the second engage means, which is a brake, is arranged on the outer space of the hydraulic servo for the second clutch.

13. The vehicular automatic transmission according to claim 11, wherein the vehicular automatic transmission is a transversely mounted transmission having a differential device; and a differential ring gear of the differential device is arranged at a location axially overlapping with the outer space of the hydraulic servo for the third clutch and the frictional member of the third clutch.

14. The vehicular automatic transmission according to claim 9, wherein the third clutch and the reduction planetary gear are arranged on a front side and the first and second clutches are arranged on a rear side with respect to the planetary gear set; and the first engage means is arranged on the radially outer space of the third clutch.

15. The vehicular automatic transmission according to claim 9, wherein the first engage means is a band brake.

16. The vehicular automatic transmission according to claim 9, wherein an oil passage leading to the hydraulic servo for the third clutch and a lubricating oil passage communicate with an in-casing oil passage in one casing wall; and oil passages leading to the hydraulic servos for the first and second clutches communicate with an in-casing oil passage in the other casing wall.

17. The vehicular automatic transmission according to claim 2, wherein a counter gear outputting an output of the planetary gear set to another shaft is provided; and the counter gear is arranged between the planetary gear set and the third clutch.

18. The vehicular automatic transmission according to claim 2, wherein the planetary gear set is equipped with at least four speed-change elements;

the first speed-change element is connected to the reduction planetary gear by the first clutch in an engageable and disengageable manner;

the second speed-change element is connected to the reduction planetary gear by the third clutch in an engageable and disengageable manner and can be engaged to a transmission casing by first engage means;

the third speed-change element is connected to the input shaft by a second clutch of the three clutches in an engageable and disengageable manner and can be engaged to the transmission casing by second engage means; and the fourth speed-change element is connected to an output member.

* * * * *